(12) United States Patent
Manabe et al.

(10) Patent No.: US 10,975,308 B2
(45) Date of Patent: Apr. 13, 2021

(54) LIQUID-CRYSTALLINE MEDIUM

(71) Applicant: MERCK PATENT GMBH, Darmstadt (DE)

(72) Inventors: Atsutaka Manabe, Bensheim (DE); Rocco Fortte, Frankfurt am Main (DE); Dagmar Klass, Darmstadt (DE); Renate Seeger, Riedstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 51 days.

(21) Appl. No.: 15/575,725

(22) PCT Filed: Apr. 27, 2016

(86) PCT No.: PCT/EP2016/000675
§ 371 (c)(1),
(2) Date: Nov. 20, 2017

(87) PCT Pub. No.: WO2016/188605
PCT Pub. Date: Dec. 1, 2016

(65) Prior Publication Data
US 2018/0291270 A1    Oct. 11, 2018

(30) Foreign Application Priority Data

May 22, 2015 (EP) .................................... 15001563

(51) Int. Cl.
*C09K 19/54* (2006.01)
*C09K 19/18* (2006.01)
*H01Q 3/36* (2006.01)
*G02B 27/00* (2006.01)
*C09K 19/34* (2006.01)
(Continued)

(52) U.S. Cl.
CPC .............. *C09K 19/54* (2013.01); *C09K 19/18* (2013.01); *C09K 19/3003* (2013.01); *C09K 19/3483* (2013.01); *G02B 27/0087* (2013.01); *H01Q 3/36* (2013.01); *C09K 2019/123* (2013.01); *C09K 2019/183* (2013.01); *C09K 2019/3025* (2013.01); *C09K 2219/11* (2013.01)

(58) Field of Classification Search
CPC ........ C09K 19/18; C09K 19/52; C09K 19/54; G02B 27/0087; H01Q 3/36
See application file for complete search history.

(56) References Cited
U.S. PATENT DOCUMENTS 7,524,540 B2    4/2009  Saito
8,999,460 B2 *  4/2015  Goebel .............. G02F 1/13306
                                                      428/1.1
(Continued)

FOREIGN PATENT DOCUMENTS

DE   102011117937 A1     6/2012
DE   102012008570 A1 * 10/2012  ........... C07D 211/58
(Continued)

OTHER PUBLICATIONS

International Search Report PCT/EP2016/000675 dated Jul. 15, 2016.

*Primary Examiner* — Chanceity N Robinson
*Assistant Examiner* — Anna Malloy
(74) *Attorney, Agent, or Firm* — Millen White Zelano and Branigan, PC; John Sopp

(57) ABSTRACT

A liquid-crystalline media comprising
one or more compounds of formula S

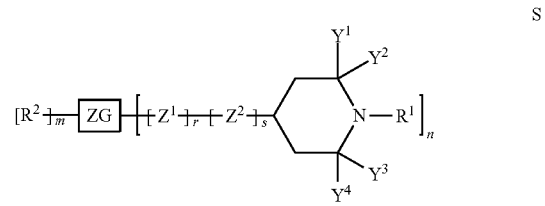

where the parameters have the meaning defined in claim 1,
and
   one or more compounds of the formula I and
   one or more compounds of the formula II
or
   one or more compounds of the formula I and
   one or more compounds of the formula III
or
   one or more compounds of the formula II and
   one or more compounds of the formula III
or
   one or more compounds of the formula I and
   one or more compounds of the formula II and
   one or more compounds of the formula III:

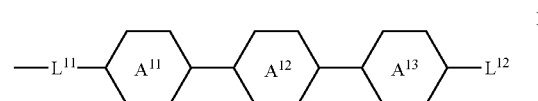
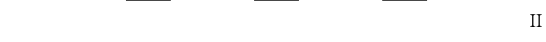
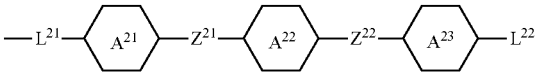
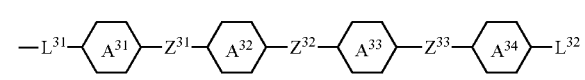

(Continued)

in which the parameters have the meaning indicated in claim 1, and to components comprising these media for high-frequency technology, in particular phase shifters and microwave array antennas.

10 Claims, No Drawings

(51) Int. Cl.
  *C09K 19/30* (2006.01)
  *C09K 19/12* (2006.01)

(56) References Cited

U.S. PATENT DOCUMENTS

| | | | | |
|---|---|---|---|---|
| 9,388,339 | B2 * | 7/2016 | Goebel | H04L 7/08 |
| 9,434,882 | B2 | 9/2016 | Goebel | |
| 9,493,703 | B2 | 11/2016 | Manabe | |
| 9,657,231 | B2 * | 5/2017 | Manabe | C09K 19/12 |
| 9,688,915 | B2 | 6/2017 | Furusato | |
| 9,714,381 | B2 * | 7/2017 | Archetti | C09K 19/062 |
| 10,214,692 | B2 * | 2/2019 | Hirschmann | C09K 19/14 |
| 10,301,544 | B2 * | 5/2019 | Hung | C09K 19/3003 |
| 10,400,169 | B2 * | 9/2019 | Hirschmann | C09K 19/3458 |
| 2012/0119141 | A1 * | 5/2012 | Manabe | C09K 19/12 |
| | | | | 252/299.01 |
| 2013/0292608 | A1 * | 11/2013 | Manabe | C09K 19/18 |
| | | | | 252/299.62 |
| 2014/0021409 | A1 * | 1/2014 | Manabe | C09K 19/18 |
| | | | | 252/299.63 |
| 2014/0111730 | A1 * | 4/2014 | Goebel | C09K 19/3098 |
| | | | | 349/56 |
| 2015/0184077 | A1 * | 7/2015 | Goetz | C09K 19/20 |
| | | | | 252/299.61 |
| 2016/0122647 | A1 | 5/2016 | Furusato | |

FOREIGN PATENT DOCUMENTS

| | | | | |
|---|---|---|---|---|
| DE | 102012008570 A1 | 10/2012 | | |
| EP | 1785466 A1 | 5/2007 | | |
| EP | 2514800 A2 | 10/2012 | | |
| KR | 201212099 A | 11/2012 | | |
| WO | 2013045029 A1 | 4/2013 | | |
| WO | WO-2013182271 A1 * | 12/2013 | | C09K 19/20 |
| WO | 2014208320 A1 | 12/2014 | | |
| WO | 2015001916 A1 | 1/2015 | | |

* cited by examiner

LIQUID-CRYSTALLINE MEDIUM

The present invention relates to liquid-crystalline media stabilised with "hindered amine light stabilisers" (HALS) and to high-frequency components comprising the same, especially microwave components for high-frequency devices, such as devices for shifting the phase of microwaves, in particular for microwave phased-array antennas.

Liquid-crystalline media have been used for decades in electro-optical displays (liquid crystal displays—LCDs) for the purpose of information display. A different application developed more recently is their use in components for microwave technology, such as, for example, disclosed in DE 10 2004 029 429 A and in JP 2005-120208 (A).

As a typical microwave application, the concept of the inverted microstrip line as described by K. C. Gupta, R. Garg, I. Bahl and P. Bhartia: Microstrip Lines and Slotlines, $2^{nd}$ ed., Artech House, Boston, 1996, is employed, for example, in D. Dolfi, M. Labeyrie, P. Joffre and J. P. Huignard: Liquid Crystal Microwave Phase Shifter. *Electronics Letters*, Vol. 29, No. 10, pp. 926-928, May 1993; N. Martin, N. Tentillier, P. Laurent, B. Splingart, F. Huert, P H. Gelin, C. Legrand: Electrically Microwave Tunable Components Using Liquid Crystals. $32^{nd}$ European Microwave Conference, pp. 393-396, Milan 2002; or in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002; C. Weil, G. Lüssem, and R. Jakoby: Tunable Invert-Microstrip Phase Shifter Device Using Nematic Liquid Crystals, *IEEE MTT-S Int. Microw. Symp.*, Seattle, Wash., June 2002, pp. 367-370, together with the commercial liquid crystal K15 from Merck KGaA. C. Weil, G. Lüssem, and R. Jakoby: Tunable Invert-Microstrip Phase Shifter Device Using Nematic Liquid Crystals, *IEEE MTT-S Int. Microw. Symp.*, Seattle, Wash., June 2002, pp. 367-370, achieved phase shifter qualities of 12°/dB at 10 GHz with a control voltage of about 40 V therewith. The insertion losses of the LC, i.e. the losses caused only by the polarisation losses in the liquid crystal, are given as approximately 1 to 2 dB at 10 GHz in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002. In addition, it has been determined that the phase shifter losses are determined primarily by the dielectric LC losses and the losses at the waveguide junctions. T. Kuki, H. Fujikake, H. Kamoda and T. Nomoto: Microwave Variable Delay Line Using a Membrane Impregnated with Liquid Crystal. *IEEE MTT-S Int. Microwave Symp. Dig.* 2002, pp. 363-366, June 2002, and T. Kuki, H. Fujikake, T. Nomoto: Microwave Variable Delay Line Using Dual-Frequency Switching-Mode Liquid Crystal. *IEEE Trans. Microwave Theory Tech.*, Vol. 50, No. 11, pp. 2604-2609, November 2002, also address the use of polymerised LC films and dual-frequency switching-mode liquid crystals in combination with planar phase shifter arrangements.

A. Penirschke, S. Müller, P. Scheele, C. Weil, M. Wittek, C. Hock and R. Jakoby: "Cavity Perturbation Method for Characterization of Liquid Crystals up to 35 GHz", $34^{th}$ European Microwave Conference—Amsterdam, pp. 545-548 describe, inter alia, the properties of the known single liquid-crystalline substance K15 (Merck KGaA, Germany) at a frequency of 9 GHz.

A. Gaebler, F. Goelden, S. Müller, A. Penirschke and R. Jakoby "Direct Simulation of Material Permittivites using an Eigen-Susceptibility Formulation of the Vector Variational Approach", 12MTC 2009—International Instrumentation and Measurement Technology Conference, Singapore, 2009 (IEEE), pp. 463-467, describe the corresponding properties of the known liquid-crystal mixture E7 (likewise Merck KGaA, Germany).

DE 10 2004 029 429 A describes the use of liquid-crystal media in microwave technology, inter alia in phase shifters.

DE 10 2004 029 429 A has already investigated liquid-crystalline media with respect to their properties in the corresponding frequency range. In addition, it describes liquid-crystalline media which comprise compounds of the formulae

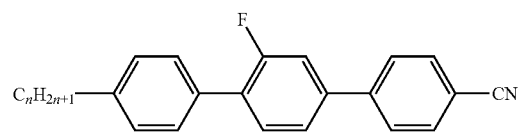

besides compounds of the formulae

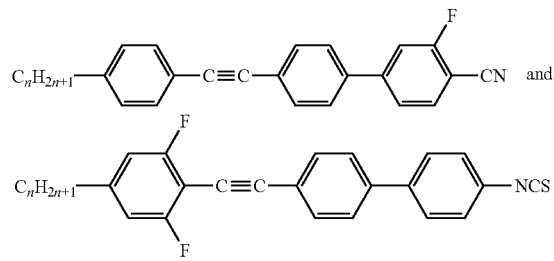

or besides compounds of the formulae

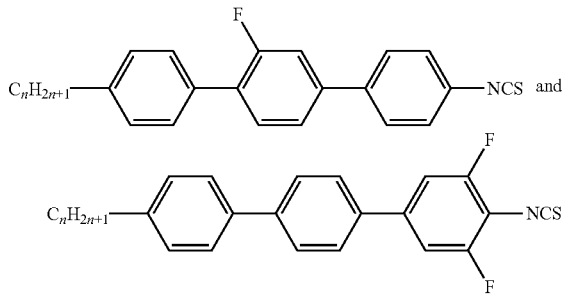

However, these compositions are afflicted with disadvantages. Most of them result, besides other deficiencies, in disadvantageously high losses and/or inadequate phase shifts or inadequate material quality.

For these applications, liquid-crystalline media with particular, hitherto rather unusual and uncommon properties, or combinations of properties, are required.

Further development in the field was achieved, in particular regarding reduction of the loss in the microwave region and improvement of the material quality (η), as disclosed e.g. in WO 2011/009524 and in WO 2013/045029.

When in use, the liquid-crystal based microwave devices will be exposed to environmental radiation, as for example proton beam, electron beam, and gamma rays. These influences are especially enhanced when the displays and devices are used in airplanes or space. For the space use, robustness of the system against the radiation stress is crucial. Up to now, protection of the displays and devices mostly are done passively (e.g. shielding), but with considerable limitations. For practical reasons and ease of manufacture it would be advantageous if the LC material itself were robust against radiation.

There is, therefore, a considerable demand for liquid-crystalline media having suitable properties for corresponding practical applications.

The use of so-called "hindered amine light stabilisers", HALS for short, has already been proposed for the stabilisation of liquid-crystal mixtures.

Nematic liquid-crystal mixtures having negative dielectric anisotropy which comprise a small amount of TINUVIN® 770, a compound of the formula

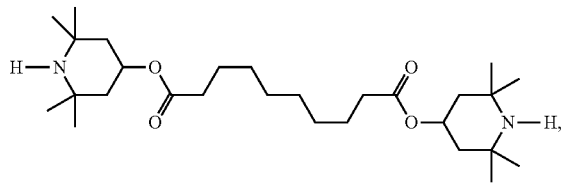

as stabiliser, are proposed, for example, in WO 2009/129911 A1.

The use of various stabilisers in liquid-crystalline media is described, for example, in JP (S)55-023169 (A), JP (H)05-117324 (A), WO 02/18515 A1 and JP (H) 09-291282 (A).

TINUVIN® 123, a compound of the formula

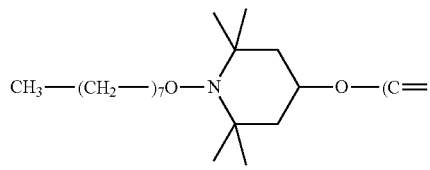

has also been proposed for stabilisation purposes.

Mesogenic compounds containing one or two HALS units are disclosed in EP 1 1784 442 A1.

HALS with various substituents on the nitrogen atom are compared with respect to their $pK_B$ values in Ohkatsu, Y., *J. of Japan Petroleum Institute*, 51, 2008, pages 191-204. The following types of structural formulae are disclosed here.

| Type | Active group of the stabiliser |
|---|---|
| "HALS" | 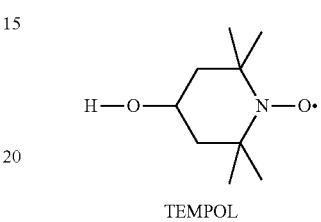 |
| "R-HALS" or "NR-HALS" | 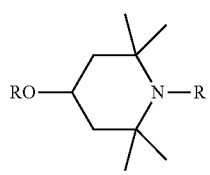 |
| "NOR-HALS" | 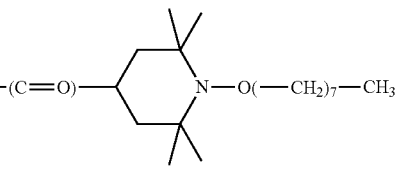 |

The compound TEMPOL, of the following formula:

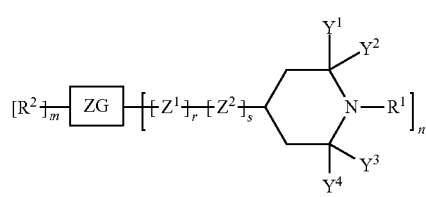

TEMPOL is known; it is mentioned, for example, in Miéville, P. et al., Angew. Chem. 2010, 122, pages 6318-6321. It is commercially available from various manufacturers and is employed, for example, as polymerisation inhibitor and, in particular in combination with UV absorbers, as light or UV protection in formulations for precursors of polyolefins, polystyrenes, polyamides, coatings and PVC.

Surprisingly, it has now been found that it is possible to achieve liquid-crystalline media having a suitably high $\Delta\epsilon$, a suitable, nematic phase range and $\Delta n$ which do not have the disadvantages of the prior-art materials, or at least only do so to a considerably reduced extent.

These improved liquid-crystalline media in accordance with the present invention comprise
a stabiliser of formula S $$[R^2]_m - \boxed{ZG} - [[Z^1]_r - [Z^2]_s - \underset{Y^3}{\overset{Y^1}{\underset{Y^4}{\overset{Y^2}{\diagdown}}}} N - R^1 ]_n \quad S$$

in which
n denotes 1 or 2, preferably 2,
m denotes (4-n),
☐ denotes an organic radical having 4 bonding sites,
$Z^1$ and $Z^2$, independently of one another, denote —O—, —(C=O)—, —(N—R⁴)— or a single bond, but do not both simultaneously denote —O—, r and s, independently of one another, denote 0 or 1,
$Y^1$ to $Y^4$ each, independently of one another, denote alkyl having 1 to 4 C atoms and alternatively, also independently of one another, one or both of the pairs ($Y^1$ and $Y^2$) and ($Y^3$ and $Y^4$) together denote a divalent group having 3 to 6 atoms,
$R^1$ denotes H, O•, O—$R^3$, or OH, preferably H, O•, or O—$R^3$,
$R^2$ on each occurrence, independently of one another, denotes H, F, OR$^4$, NR$^4$R$^5$, a straight-chain or branched alkyl chain having 1-20 C atoms, in which one —CH$_2$— group or a plurality of —CH$_2$— groups may be replaced by —O— or —C(=O)—, but two adjacent —CH$_2$— groups cannot be replaced by —O—, or denotes a hydrocarbon radical which contains a cycloalkyl or alkylcycloalkyl unit, and in which one —CH$_2$— group or a plurality of —CH$_2$— groups may be replaced by —O— or —C(=O)—, but two adjacent —CH$_2$— groups cannot be replaced by —O—, and in which one H atom or a plurality of H atoms may be replaced by OR$^4$, N(R$^4$)(R$^5$) or R$^6$, or denotes an aromatic or heteroaromatic hydrocarbon radical, in which one H atom or a plurality of H atoms may be replaced by OR$^4$, N(R$^4$)(R$^5$) or R$^6$,
$R^3$ on each occurrence, independently of one another, denotes a straight-chain or branched alkyl chain having 1-20 C atoms, in which one —CH$_2$— group or a plurality of —CH$_2$— groups may be replaced by —O— or —C(=O)—, but two adjacent —CH$_2$— groups cannot be replaced by —O—, or denotes a hydrocarbon radical which contains a cycloalkyl or alkylcycloalkyl unit, and in which one —CH$_2$— group or a plurality of —CH$_2$— groups may be replaced by —O— or —C(=O)—, but two adjacent —CH$_2$— groups cannot be replaced by —O—, and in which one H atom or a plurality of H atoms may be replaced by OR$^4$, N(R$^4$)(R$^5$) or R$^6$, or denotes an aromatic or heteroaromatic hydrocarbon radical, in which one H atom or a plurality of H atoms may be replaced by OR$^4$, N(R$^4$)(R$^5$) or R$^6$,
or can be

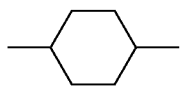

(1,4-cyclohexylene), in which one or more —CH$_2$— groups may be replaced by —O—, —CO— or —NR$^4$—, or an acetophenyl, isopropyl or 3-heptyl radical,
$R^4$, $R^5$ on each occurrence, independently of one another, denotes a straight-chain or branched alkyl or acyl group having 1 to 10 C atoms or an aromatic hydrocarbon or carboxyl radical having 6-12 C atoms,
$R^6$ on each occurrence, independently of one another, denotes a straight-chain or branched alkyl group having 1 to 10 C atoms, in which one —CH$_2$— group or a plurality of —CH$_2$— groups may be replaced by —O— or —C(=O)—, but two adjacent —CH$_2$— groups cannot be replaced by —O—,
preferably with the provisos that,
in the case where n=1, $R^1$=O• and —[Z$^1$-]$_r$-[Z$^2$]$_s$—=—O—, —(CO)—O—, —O—(CO)—, —O—(CO)—O—, —NR$^4$— or —NR$^4$—(CO)—,

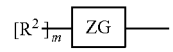

does not denote
a straight-chain or branched alkyl having 1 to 10 C atoms, also cycloalkyl, cycloalkylalkyl or alkylcycloalkyl, where one or more —CH$_2$— groups in all these groups may be replaced by —O— in such a way that two O atoms in the molecule are not bonded directly to one another, and/or
in the case where n=2 and $R^1$=O•,

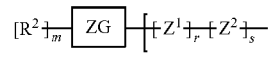

does not denote

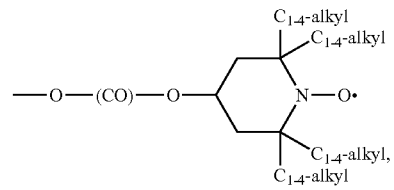

and/or
in the case where n=2 and $R^1$=O—$R^3$,
$R^3$ does not denote n-C$_{1-9}$-alkyl,
and
one or more compounds of the formula I and
one or more compounds of the formula II
or
one or more compounds of the formula I and
one or more compounds of the formula III
or
one or more compounds of the formula II and
one or more compounds of the formula III
or
one or more compounds of the formula I and
one or more compounds of the formula II and
one or more compounds of the formula III

I in which
$L^{11}$ denotes $R^{11}$ or $X^{11}$,
$L^{12}$ denotes $R^{12}$ or $X^{12}$,
$R^{11}$ and $R^{12}$, independently of one another, denote H, unfluorinated alkyl or unfluorinated alkoxy having 1 to 17, preferably having 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl,
$X^{11}$ and $X^{12}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and

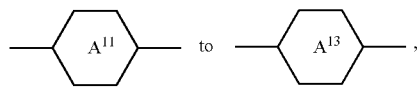

independently of one another, denote

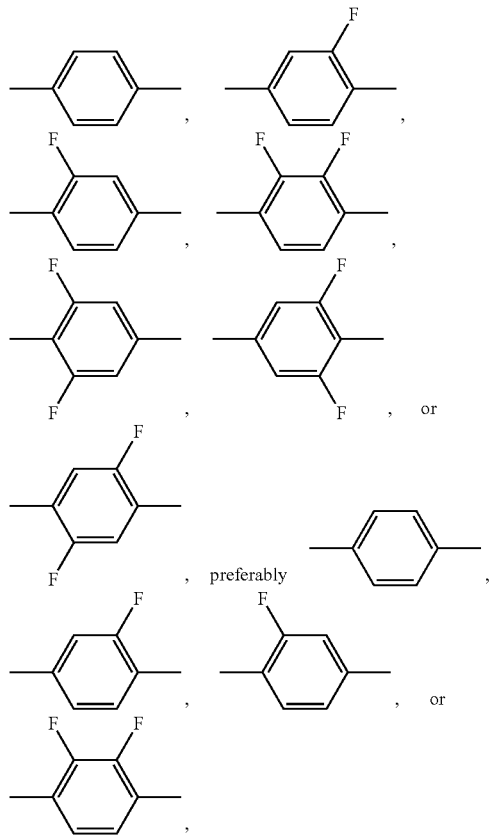

, preferably

, or

in which
L$^{21}$ denotes R$^{21}$ and, in the case where Z$^{21}$ and/or Z$^{22}$ denote trans-CH=CH— or trans-CF=CF—, alternatively denotes X$^{21}$,
L$^{22}$ denotes R$^{22}$ and, in the case where Z$^{21}$ and/or Z$^{22}$ denote trans-CH=CH— or trans-CF=CF—, alternatively denotes X$^{22}$,
R$^{21}$ and R$^{22}$, independently of one another, denote H, unfluorinated alkyl or unfluorinated alkoxy having 1 to 17, preferably having 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl,
X$^{21}$ and X$^{22}$, independently of one another, denote F or Cl, —CN, —NCS, —SF$_5$, fluorinated alkyl or alkoxy having 1 to 7 C atoms or fluorinated alkenyl, alkenyloxy or alkoxyalkyl having 2 to 7 C atoms, or —NCS, preferably —NCS, one of
Z$^{21}$ and Z$^{22}$ denotes trans-CH=CH—, trans-CF=CF— or —C≡C— and the other, independently thereof, denotes trans-CH=CH—, trans-CF=CF— or a single bond, preferably one of them denotes —C≡C— or trans-CH=CH— and the other denotes a single bond, and

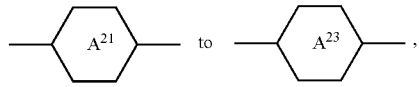

independently of one another, denote

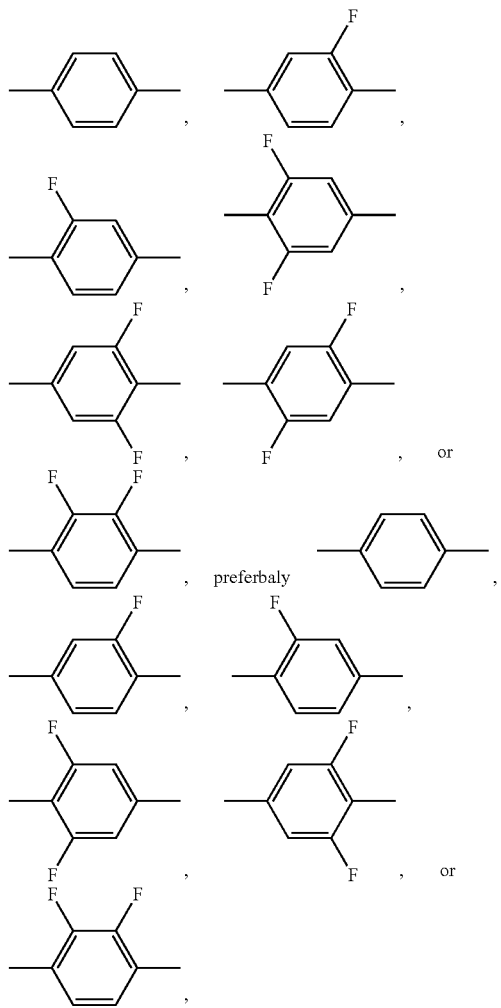

, preferbaly

, or

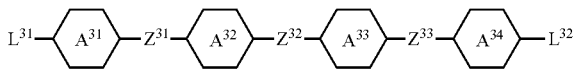

in which
L$^{31}$ denotes R$^{31}$ or X$^{31}$,
L$^{32}$ denotes R$^{32}$ or X$^{32}$,
R$^{31}$ and R$^{32}$, independently of one another, denote H, unfluorinated alkyl or unfluorinated alkoxy having 1 to 17, preferably having 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl, $X^{31}$ and $X^{32}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and $Z^{31}$ to $Z^{33}$, independently of one another, denote trans-CH=CH—, trans-CF=CF—, —C≡C— or a single bond, preferably one or more of them denotes a single bond, particularly preferably all denote a single bond, and

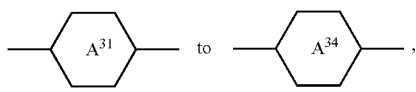

independently of one another, denote

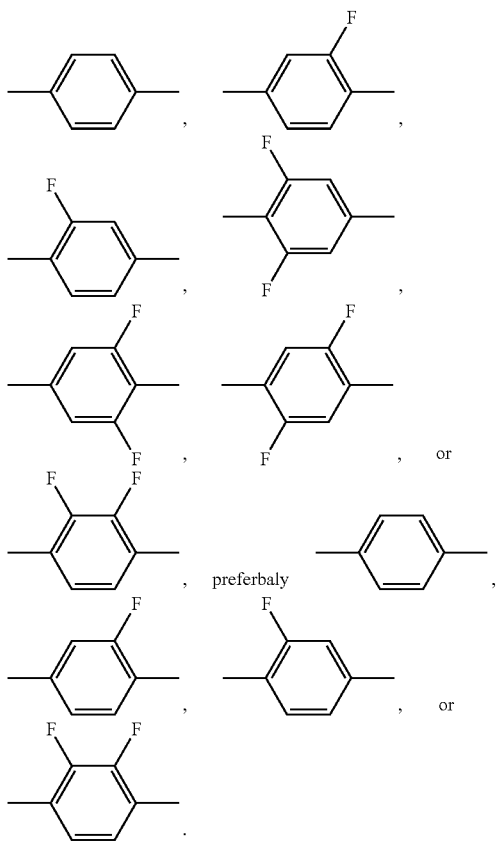

In a preferred embodiment of the present invention, the liquid-crystalline media comprise one or more compounds of the formula I and one or more compounds of the formula III.

In a further preferred embodiment of the present invention, the liquid-crystalline media comprise one or more compounds of the formula I and one or more compounds of the formula II.

The liquid-crystalline media in accordance with the present invention likewise preferably comprise one or more compounds of the formula II and one or more compounds of the formula III.

Particular preference is given in accordance with the present invention to liquid-crystalline media which comprise one or more compounds of the formula I, one or more compounds of the formula II and one or more compounds of the formula III.

The liquid-crystalline media in accordance with the present application preferably comprise in total 1 to 10000 ppm, preferably 10 to 7500 ppm and particularly preferably 100 to 5000 ppm, of compounds of the formula S.

The liquid-crystalline media in accordance with the present application preferably comprise in total 15 to 90%, preferably 20 to 85% and particularly preferably 25 to 80%, of compounds of the formula I.

The liquid-crystalline media in accordance with the present application preferably comprise in total 1 to 70%, preferably 2 to 65% and particularly preferably 3 to 60%, of compounds of the formula II.

The liquid-crystalline media in accordance with the present application preferably comprise in total 0 to 60%, preferably 5 to 55% and particularly preferably 10 to 50%, of compounds of the formula III.

In a preferred embodiment of the present invention, in which the liquid-crystalline media comprise in each case one or more compounds of the formulae I, II and III, the concentration of the compounds of the formula I is preferably 45 to 75%, preferably 50 to 70% and particularly preferably 55 to 65%, the concentration of the compounds of the formula II is preferably 1 to 20%, preferably 2 to 15% and particularly preferably 3 to 10%, and the concentration of the compounds of the formula III is preferably 1 to 30%, preferably 5 to 25% and particularly preferably 5 to 20%.

In a further preferred embodiment of the present invention, in which the liquid-crystalline media comprise in each case one or more compounds of the formulae I, II and III, the concentration of the compounds of the formula I is preferably 15 to 40%, preferably 20 to 35% and particularly preferably 25 to 30%, the concentration of the compounds of the formula II is preferably 10 to 35%, preferably 15 to 30% and particularly preferably 20 to 25%, and the concentration of the compounds of the formula III is preferably 25 to 50%, preferably 30 to 45% and particularly preferably 35 to 40%.

In a preferred embodiment of the present invention, in which the liquid-crystalline media comprise in each case one or more compounds of the formulae I and II, but at most 5% and preferably no compounds of the formula III, the concentration of the compounds of the formula I is preferably 10 to 50%, preferably 20 to 40% and particularly preferably 25 to 35%, the concentration of the compounds of the formula II is preferably 40 to 70%, preferably 50 to 65% and particularly preferably 55 to 60%, and the concentration of the compounds of the formula III is preferably 1 to 4%, preferably 1 to 3% and particularly preferably 0%.

The liquid-crystalline media in accordance with the present application particularly preferably comprise in total 50 to 80%, preferably 55 to 75% and particularly preferably 57 to 70%, of compounds of the formula I-1 and/or in total 5 to 70%, preferably 6 to 50% and particularly preferably 8 to 20% of compounds selected from the group of the compounds of the formulae I-2 and I-3.

The liquid-crystalline media in accordance with the present application likewise preferably comprise in total 5 to 60%, preferably 10 to 50% and particularly preferably 7 to 20% of compounds of the formula II.

In the case of the use of a single homologous compound, these limits correspond to the concentration of this homologue, which is preferably 2 to 20%, particularly preferably 1 to 15%. In the case of the use of two or more homologues, the concentration of the individual homologues is likewise preferably in each case 1 to 15%.

The compounds of the formulae I to III in each case include dielectrically positive compounds having a dielectric anisotropy of greater than 3, dielectrically neutral compounds having a dielectric anisotropy of less than 3 and greater than −1.5 and dielectrically negative compounds having a dielectric anisotropy of −1.5 or less.

In a preferred embodiment of the present invention, the liquid-crystal medium comprises one or more compounds of the formula S selected from the group of the compounds of the sub-formulae S1 to S3

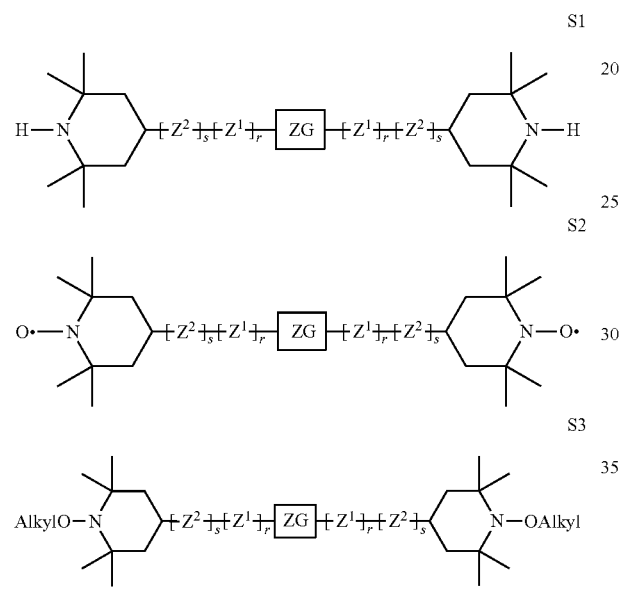

where
$Z^1$, $Z^2$ independently of one another, denote —O—, —(C═O)—, or a single bond, but do not both simultaneously denote —O—,
r and s, independently of one another, denote 0 or 1,
☐ denotes a straight-chain or branched alkyl having 1 to 20 C atoms, also cycloalkyl, cycloalkylalkyl or alkylcycloalkyl, where one or more —CH$_2$— groups in all these groups may be replaced by —O— in such a way that two O atoms in the molecule are not bonded directly to one another, and/or
Alkyl denotes a straight-chain or branched alkyl having 1 to 20 C atoms Particularly preferred are compounds of the following sub-formulae:

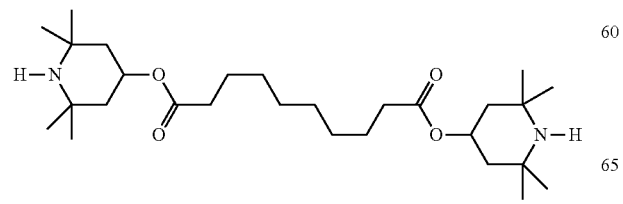

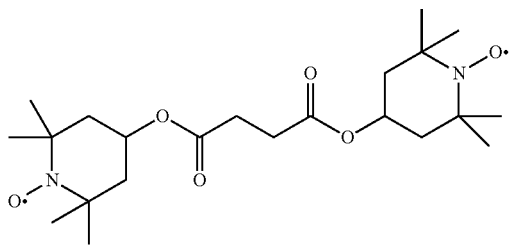

In a preferred embodiment of the present invention, the liquid-crystal medium comprises one or more compounds of the formula I, preferably selected from the group of the compounds of the formulae I-1 to I-3, preferably of the formulae I-1 and/or I-2 and/or I-3, preferably of the formulae I-1 and I-2, more preferably these compounds of the formula I predominantly consist, even more preferably essentially consist and very particularly preferably completely consist thereof:

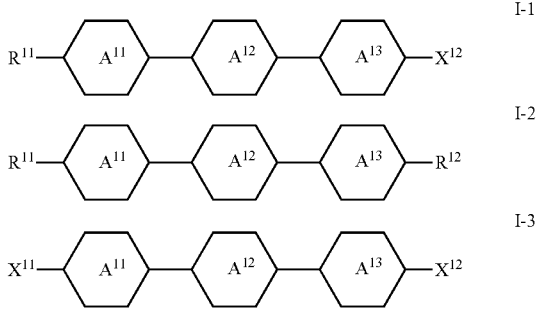

in which the parameters have the respective meanings indicated above for formula I and preferably $R^{11}$ denotes unfluorinated alkyl having 1 to 7 C atoms or unfluorinated alkenyl having 2 to 7 C atoms, $R^{12}$ denotes unfluorinated alkyl having 1 to 7 C atoms or unfluorinated alkenyl having 2 to 7 C atoms or unfluorinated alkoxy having 1 to 7 C atoms, $X^{11}$ and $X^{12}$, independently of one another, denote F, Cl, OCF$_3$, CF$_3$, —CN, —NCS or SF$_5$, preferably F, Cl, OCF$_3$ or —CN.

The compounds of the formula I-1 are preferably selected from the group of the compounds of the formulae I-1a to I-1d, more preferably these compounds of the formula I-1 predominantly consist, even more preferably essentially consist and very particularly preferably completely consist thereof:

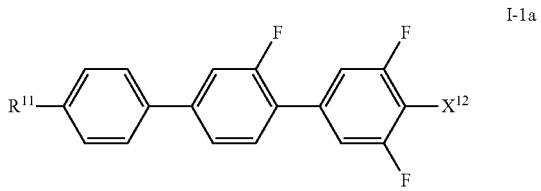

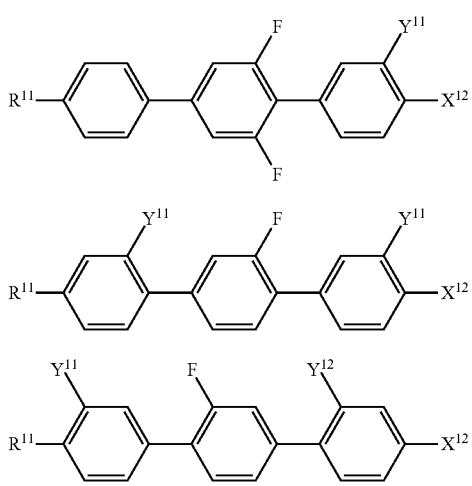

in which the parameters have the respective meanings indicated above for formula I-1 and in which $Y^{11}$ and $Y^{12}$ independently of one another, denote H or F, and preferably $R^{11}$ denotes alkyl or alkenyl, and $X^{12}$ denotes F, Cl or $OCF_3$.

The compounds of the formula I-2 are preferably selected from the group of the compounds of the formulae I-2a to I-2e and/or from the group of the compounds of the formulae I-2f and I-2g, more preferably these compounds of the formula I-2 predominantly consist, even more preferably essentially consist and very particularly preferably completely consist thereof:

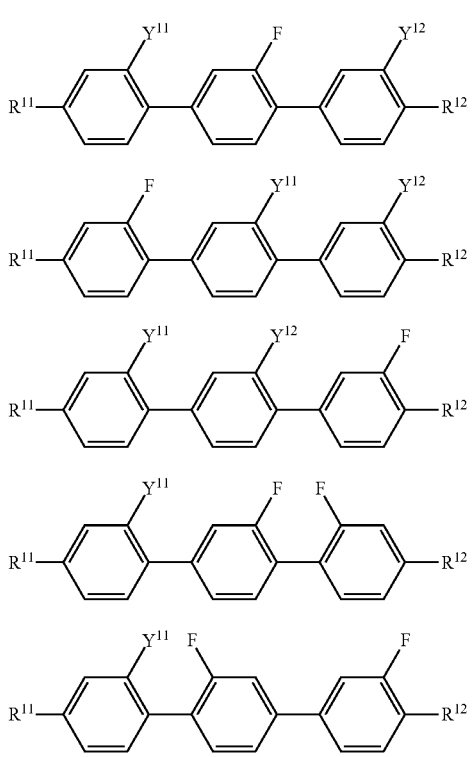

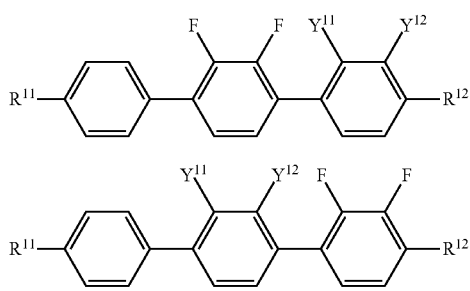

where in each case the compounds of the formula I-2a are excluded from the compounds of the formulae I-2b and I-2c, the compounds of the formula I-2b are excluded from the compounds of the formulae I-2c and the compounds of the formula I-2g are excluded from the compounds of the formulae I-2f, and in which the parameters have the respective meanings indicated above for formula I-1 and in which $Y^{11}$ and $Y^{12}$ each, independently of one another, denote H or F, and preferably $R^{12}$ denotes alkyl or alkenyl, $Y^{11}$ and $Y^{12}$ denotes H and the other denotes H or F, preferably likewise denotes H.

The compounds of the formula I-3 are preferably compounds of the formula I-3a:

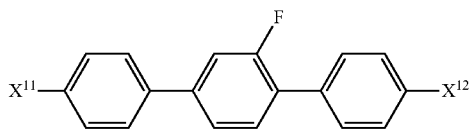

in which the parameters have the respective meanings indicated above for formula I-1 and in which preferably $X^1$ denotes F, Cl, preferably F, $X^{12}$ denotes F, Cl or —$OCF_3$, preferably —$OCF_3$.

In an even more preferred embodiment of the present invention, the compounds of the formula I are selected from the group of the compounds I-1a to I-1d, preferably selected from the group of the compounds I-1c and I-1d, more preferably the compounds of the formula I predominantly consist, even more preferably essentially consist and very particularly preferably completely consist thereof:

The compounds of the formula I-1a are preferably selected from the group of the compounds I-1a-1 and I-1a-2, more preferably these compounds of the formula I-1a predominantly consist, even more preferably essentially consist and very particularly preferably completely consist thereof:

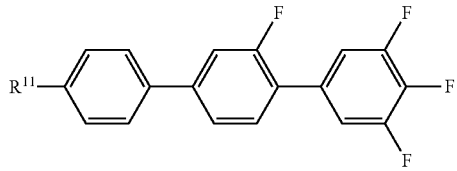

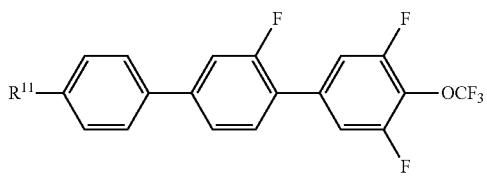

I-1a-2 in which
R[11] has the meaning indicated above and preferably denotes $C_nH_{2n+1}$, in which
n denotes an integer in the range from 0 to 7, preferably in the range from 1 to 5 and particularly preferably 3 or 7.

The compounds of the formula I-1 b are preferably compounds of the formula I-1 b-1:

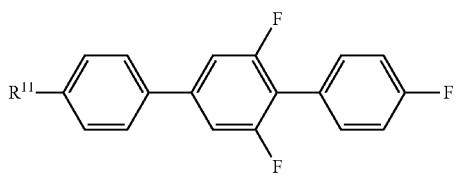

I-1b-1 in which
R[11] has the meaning indicated above and preferably denotes $C_nH_{2n+1}$, in which
n denotes an integer in the range from 0 to 15, preferably in the range from 1 to 7 and particularly preferably 1 to 5.

The compounds of the formula I-1c are preferably selected from the group of the compounds of the formulae I-1c-1 and I-1c-4, preferably selected from the group of the compounds of the formulae I-1c-1 and I-1c-2, more preferably these compounds of the formula I-1c predominantly consist, even more preferably essentially consist and very particularly preferably completely consist thereof:

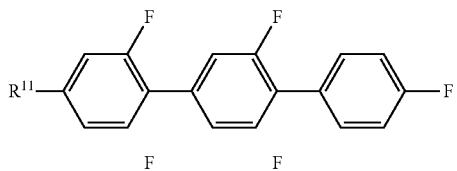

I-1c-1

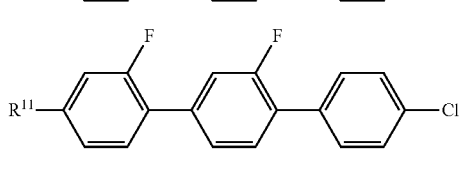

I-1c-2

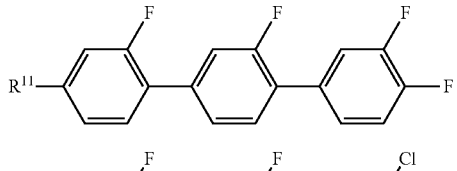

I-1c-3

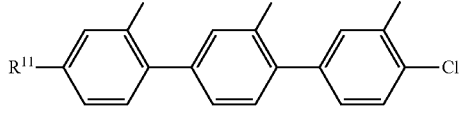

I-1c-4 in which
R[11] has the meaning indicated above and preferably denotes $C_nH_{2n+1}$, in which
n denotes an integer in the range from 0 to 15, preferably in the range from 1 to 7 and particularly preferably 1 to 5.

The compounds of the formula I-1d are preferably selected from the group of the compounds of the formulae I-1d-1 and I-1d-2, preferably the compound of the formula I-1d-2, more preferably these compounds of the formula I-1d predominantly consist, even more preferably essentially consist and very particularly preferably completely consist thereof:

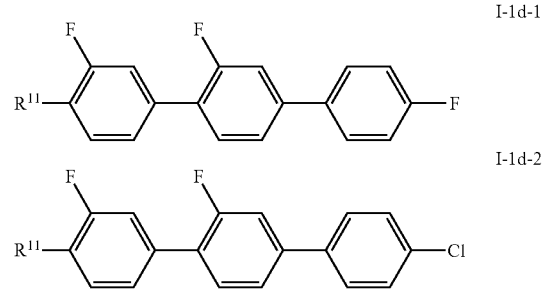

I-1d-1

I-1d-2 in which
R[11] has the meaning indicated above and preferably denotes $C_nH_{2n+1}$, in which
n denotes an integer in the range from 0 to 15, preferably in the range from 1 to 7 and particularly preferably 1 to 5.

The compounds of the formula I-2a are preferably selected from the group of the compounds of the formulae I-2a-1 and I-2a-2, preferably the compounds of the formula I-1a-1, more preferably these compounds of the formula I-2a predominantly consist, even more preferably essentially consist and very particularly preferably completely consist thereof:

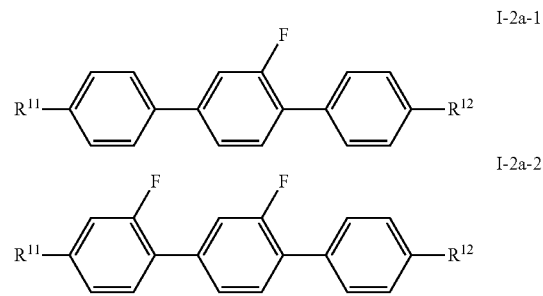

I-2a-1

I-2a-2 in which
R[11] has the meaning indicated above and preferably denotes $C_nH_{2n+1}$ or $CH_2=CH—(CH_2)_z$, and
R[12] has the meaning indicated above and preferably denotes $C_mH_{2m+1}$ or $O—C_mH_{2m+1}$ or $(CH_2)_z—CH=CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

Preferred combinations of (R[11] and R[12]), in particular in formula I-2a-1, are ($C_nH_{2n+1}$ and $C_mH_{2m+1}$), ($C_nH_{2n+1}$ and O—$C_mH_{2m+1}$), ($CH_2$=CH—($CH_2$)$_Z$ and $C_mH_{2m+1}$), ($CH_2$=CH—($CH_2$)$_Z$ and O—$C_mH_{2m+1}$) and ($C_nH_{2n+1}$ and ($CH_2$)$_Z$—CH=$CH_2$).

Preferred compounds of the formula I-2b are the compounds of the formula I-2b-1:

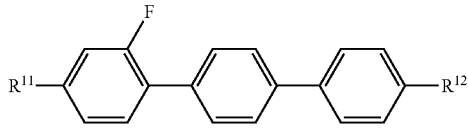

I-2b-1 in which $R^{11}$ has the meaning indicated above and preferably denotes $C_nH_{2n+1}$ or $CH_2$=CH—($CH_2$)$_Z$, and $R^{12}$ has the meaning indicated above and preferably denotes $C_mH_{2m+1}$ or O—$C_mH_{2m+1}$ or ($CH_2$)$_Z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combination of ($R^{11}$ and $R^{12}$) here is, in particular, ($C_nH_{2n+1}$ and $C_mH_{2m+1}$).

Preferred compounds of the formula I-2c are the compounds of the formula I-2c-1:

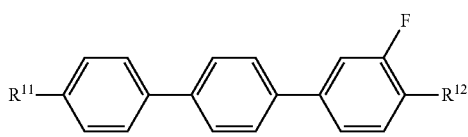

I-2c-1 in which $R^{11}$ has the meaning indicated above and preferably denotes $C_nH_{2n+1}$ or $CH_2$=CH—($CH_2$)$_Z$, and $R^{12}$ has the meaning indicated above and preferably denotes $C_mH_{2m+1}$ or O—$C_mH_{2m+1}$ or ($CH_2$)$_Z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combination of ($R^{11}$ and $R^{12}$) here is, in particular, ($C_nH_{2n+1}$ and $C_mH_{2m+1}$).

Preferred compounds of the formula I-2d are the compounds of the formula I-2d-1:

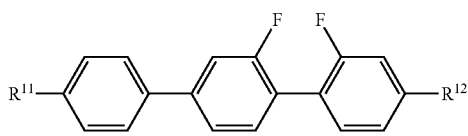

I-2d-1 in which $R^{11}$ has the meaning indicated above and preferably denotes $C_nH_{2n+1}$ or $CH_2$=CH—($CH_2$)$_Z$, and $R^{12}$ has the meaning indicated above and preferably denotes $C_mH_{2m+1}$ or O—$C_mH_{2m+1}$ or ($CH_2$)$_Z$—CH=$CH_2$, and in which n and m, independently of one another, denote an integer in the range from 0 to 15, preferably in the range from 1 to 7 and particularly preferably 1 to 5, and z 0, 1, 2, 3 or 4, preferably 0 or 2.

The preferred combination of ($R^{11}$ and $R^{12}$) here is, in particular, ($C_nH_{2n+1}$ and $C_mH_{2m+1}$).

Preferred compounds of the formula I-2e are the compounds of the formula I-2e-1:

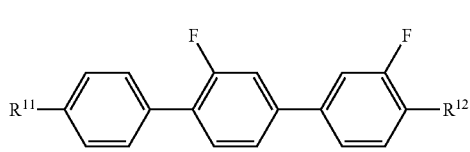

I-2e-1 in which $R^{11}$ has the meaning indicated above and preferably denotes $C_nH_{2n+1}$ or $CH_2$=CH—($CH_2$)$_Z$, and $R^{12}$ has the meaning indicated above and preferably denotes $C_mH_{2m+1}$ or O—$C_mH_{2m+1}$ or ($CH_2$)$_Z$—CH=$CH_2$, and in which n and m, independently of one another, denote an integer in the range from 0 to 15, preferably in the range from 1 to 7 and particularly preferably 1 to 5, and 0, 1, 2, 3 or 4, preferably 0 or 2.

The preferred combination of ($R^{11}$ and $R^{12}$) here is, in particular, ($C_nH_{2n+1}$ and O—$C_mH_{2m+1}$).

Preferred compounds of the formula I-2f are the compounds of the formula I-2f-1:

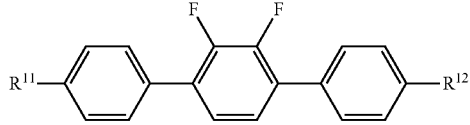

I-2f-1 in which $R^{11}$ has the meaning indicated above and preferably denotes $C_nH_{2n+1}$ or $CH_2$=CH—($CH_2$)$_Z$, and $R^{12}$ has the meaning indicated above and preferably denotes $C_mH_{2m+1}$ or O—$C_mH_{2m+1}$ or ($CH_2$)$_Z$—CH=$CH_2$, and in which n and m, independently of one another, denote an integer in the range from 0 to 15, preferably in the range from 1 to 7 and particularly preferably 1 to 5, and z 0, 1, 2, 3 or 4, preferably 0 or 2.

The preferred combinations of ($R^{11}$ and $R^{12}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$).

Preferred compounds of the formula I-2g are the compounds of the formula I-2g-1:

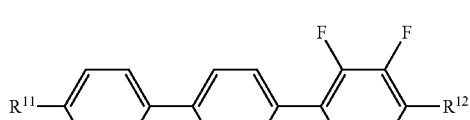

I-2g-1 in which $R^{11}$ has the meaning indicated above and preferably denotes $C_nH_{2n+1}$ or $CH_2=CH-(CH_2)_Z$, and $R^{12}$ has the meaning indicated above and preferably denotes $C_mH_{2m+1}$ or $O-C_mH_{2m+1}$ or $(CH_2)_Z-CH=CH_2$, and in which n and m, independently of one another, denote an integer in the range from 0 to 15, preferably in the range from 1 to 7 and particularly preferably 1 to 5, and 0, 1, 2, 3 or 4, preferably 0 or 2.

The preferred combinations of ($R^{11}$ and $R^{12}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $O-C_mH_{2m+1}$).

The compounds of the formula II are preferably selected from the group of the compounds of the formulae II-1 to II-4, more preferably these compounds of the formula II predominantly consist, even more preferably essentially consist and very particularly preferably completely consist thereof:

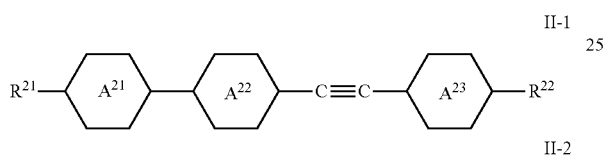

II-1

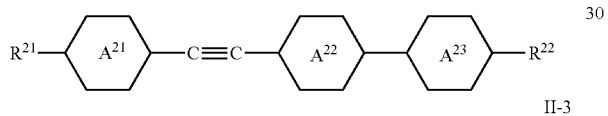

II-2

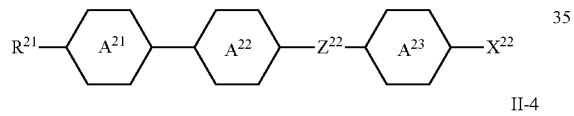

II-3

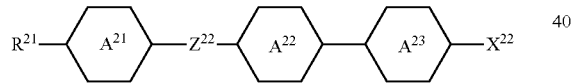

II-4 in which $Z^{21}$ and $Z^{22}$ denote trans-CH=CH— or trans-CF=CF—, preferably trans-CH=CH—, and the other parameters have the meaning given above under formula II, and preferably $R^{21}$ and $R^{22}$, independently of one another, denote H, unfluorinated alkyl or alkoxy having 1 to 7 C atoms or unfluorinated alkenyl having 2 to 7 C atoms, $X^{22}$ denotes F, Cl, —CN or —NCS, preferably —NCS, and one of

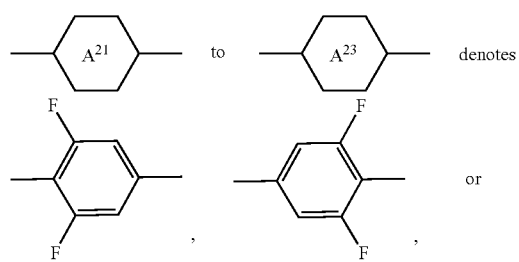

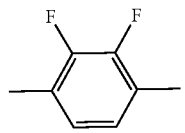

and the others, independently of one another, denote

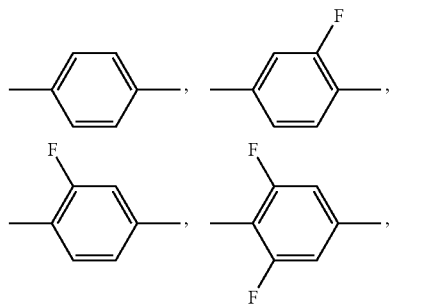

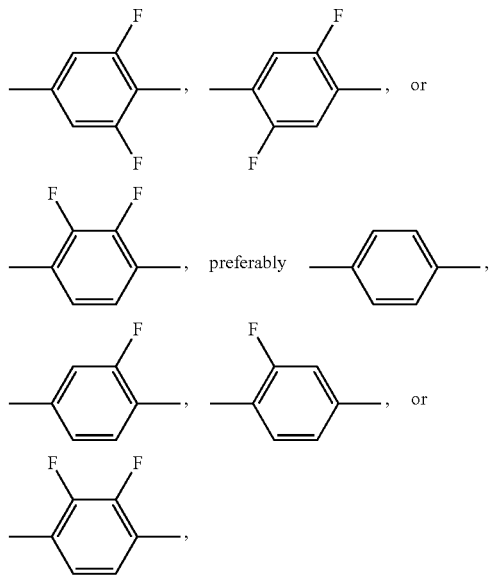

and preferably $R^{21}$ denotes $C_nH_{2n+1}$ or $CH_2=CH-(CH_2)_Z$, and $R^{22}$ denotes $C_mH_{2m+1}$ or $O-C_mH_{2m+1}$ or $(CH_2)_Z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2, and where the compounds of the formula II-2 are excluded from the compounds of the formula II-1.

The compounds of the formula II-1 are preferably selected from the group of the compounds of the formulae II-1a and II-1 b, preferably selected from the group of the compounds of the formula II-1a, more preferably these compounds of the formula II-1 predominantly consist, even more preferably essentially consist and very particularly preferably completely consist thereof:

II-1a

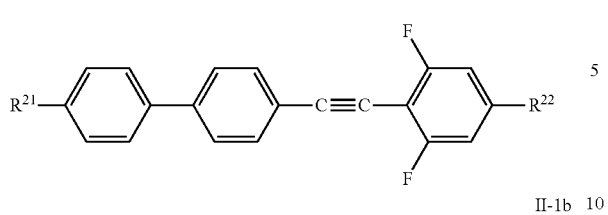

II-1b

II-3a

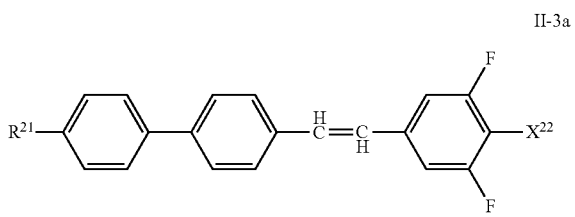

in which the parameters have the meanings indicated above for formula II-3 and preferably $R^{21}$ has the meaning indicated above and preferably denotes $C_nH_{2n+1}$, in which n denotes an integer in the range from 0 to 7, preferably in the range from 1 to 5, and $X^{22}$ denotes —F, —Cl, —OCF$_3$, —ON or —NCS, particularly preferably —NCS.

The compounds of the formula II-4 are preferably compounds of the formula II-4a:

in which $R^{21}$ has the meaning indicated above and preferably denotes $C_nH_{2n+1}$ or $CH_2$=CH—$(CH_2)_z$, and $R^{22}$ has the meaning indicated above and preferably denotes $C_mH_{2m+1}$ or O—$C_mH_{2m+1}$ or $(CH_2)_z$—CH=CH$_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{21}$ and $R^{22}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$) in the case of formula II-1a and particularly preferably ($C_nH_{2n+1}$ and O—$C_mH_{2m+1}$) in the case of formula II-1 b.

The compounds of the formula II-2 are preferably compounds of the formula II-2a:

II-4a

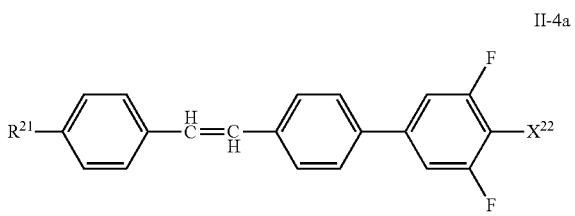

in which the parameters have the meanings indicated above for formula II-4 and preferably $R^{21}$ has the meaning indicated above and preferably denotes $C_nH_{2n+1}$, in which n denotes an integer in the range from 0 to 7, preferably in the range from 1 to 5, and $X^{22}$ denotes —F, —Cl, —OCF$_3$, —CN or —NCS, particularly preferably —NCS.

Further preferred compounds of the formula II are the compounds of the following formulae:

II-2a

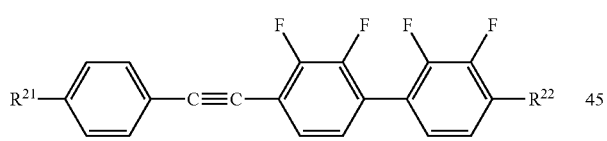

in which $R^{21}$ has the meaning indicated above and preferably denotes $C_nH_{2n+1}$ or $CH_2$=CH—$(CH_2)_z$, and $R^{22}$ has the meaning indicated above and preferably denotes $C_mH_{2m+1}$ or O—$C_mH_{2m+1}$ or $(CH_2)_z$—CH=CH$_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{21}$ and $R^{22}$) here are, in particular, ($C_nH_{2n+1}$ and $C_mH_{2m+1}$) and ($C_nH_{2n+1}$ and O—$C_mH_{2m+1}$).

The compounds of the formula II-3 are preferably compounds of the formula II-3a:

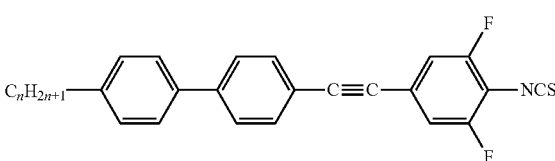

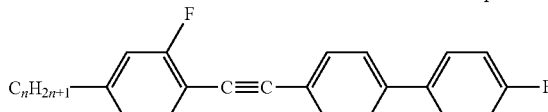

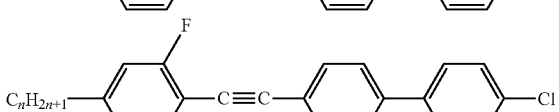

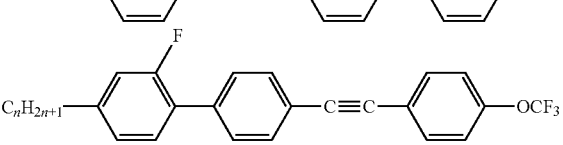

in which n denotes an integer in the range from 0 to 7, preferably in the range from 1 to 5.

The compounds of the formula III are preferably selected from the group of the compounds of the formulae III-1 to III-7, more preferably these compounds of the formula III predominantly consist, even more preferably essentially consist and very particularly preferably completely consist thereof:

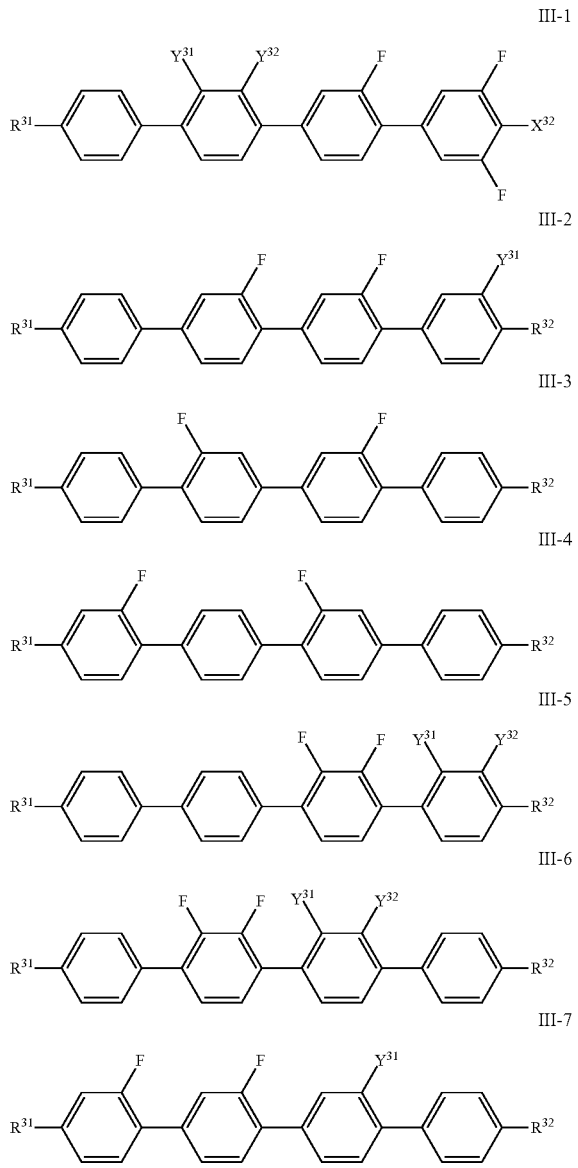

where the compounds of the formula III-5 are excluded from the compounds of the formula III-6, and in which the parameters have the respective meanings indicated above for formula III and preferably $R^{31}$ denotes unfluorinated alkyl or alkoxy, each having 1 to 7 C atoms, or unfluorinated alkenyl having 2 to 7 C atoms, $R^{32}$ denotes unfluorinated alkyl or alkoxy, each having 1 to 7 C atoms, or unfluorinated alkenyl having 2 to 7 C atoms, and $X^{32}$ denotes F, Cl, or —$OCF_3$, preferably F, $Y^{31}$ and $Y^{32}$ independently of one another, denote H or F, and particularly preferably $R^{31}$ has the meaning indicated above and preferably denotes $C_nH_{2n+1}$ or $CH_2$=CH—$(CH_2)_Z$, and $R^{32}$ has the meaning indicated above and preferably denotes $C_mH_{2m+1}$ or O—$C_mH_{2m+1}$ or $(CH_2)_Z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The compounds of the formula III-1 are preferably selected from the group of the compounds of the formulae III-1a to III-1d, more preferably these compounds of the formula III-1 predominantly consist, even more preferably essentially consist and very particularly preferably completely consist thereof:

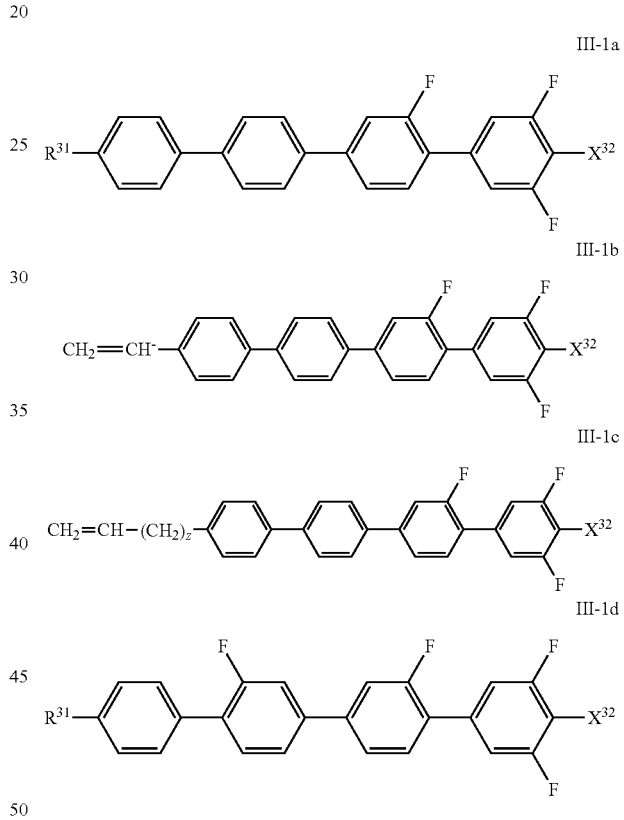

in which $X^{32}$ has the meaning given above for formula III-2 and $R^{31}$ has the meaning indicated above and preferably denotes $C_nH_{2n+1}$, in which n denotes 1 to 7, preferably 2 to 6, particularly preferably 2, 3 or 5, and z denotes 0, 1, 2, 3 or 4, preferably 0 or 2, and $X^{32}$ preferably denotes F.

The compounds of the formula III-2 are preferably selected from the group of the compounds of the formulae III-2a and III-2b, preferably of the formula III-2a, more preferably these compounds of the formula III-2 predominantly consist, even more preferably essentially consist and very particularly preferably completely consist thereof:

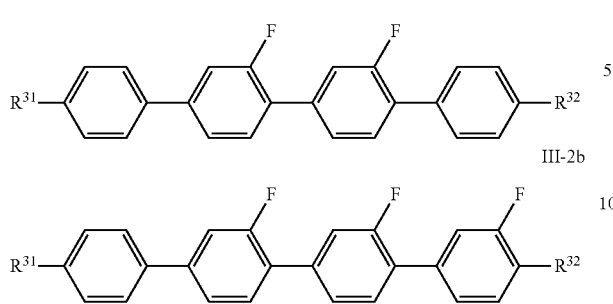

III-2a

III-2b in which
R$^{31}$ has the meaning indicated above and preferably denotes C$_n$H$_{2n+1}$ or CH$_2$=CH—(CH$_2$)$_z$, and
R$^{32}$ has the meaning indicated above and preferably denotes C$_m$H$_{2m+1}$ or O—C$_m$H$_{2m+1}$ or (CH$_2$)$_z$—CH=CH$_2$, and
in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula III-3 are preferably compounds of the formula III-3a:

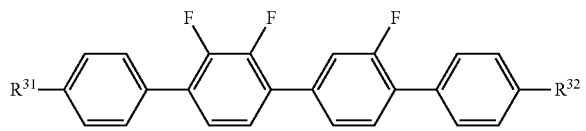

III-3a in which
R$^{31}$ has the meaning indicated above and preferably denotes C$_n$H$_{2n+1}$ or CH$_2$=CH—(CH$_2$)$_z$, and
R$^{32}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m}$+1), particularly preferably (C$_n$H$_{2n+1}$ and C$_m$H$_{2m+1}$).

The compounds of the formula III-4 are preferably compounds of the formula III-4a:

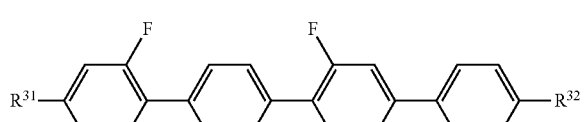

III-4a in which
R$^{31}$ has the meaning indicated above and preferably denotes C$_n$H$_{2n+1}$ or CH$_2$=CH—(CH$_2$)$_z$, and
R$^{32}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula III-5 are preferably selected from the group of the compounds of the formulae III-5a and III-5b, preferably of the formula III-5a, more preferably these compounds of the formula III-5 predominantly consist, even more preferably essentially consist and very particularly preferably completely consist thereof:

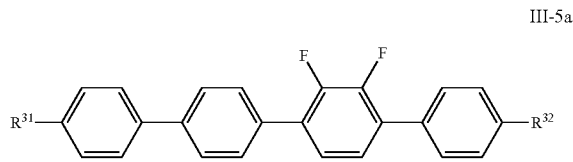

III-5a

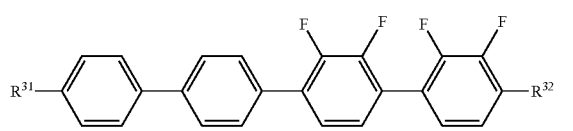

III-5b in which
R$^{31}$ has the meaning indicated above and preferably denotes C$_n$H$_{2n+1}$ or CH$_2$=CH—(CH$_2$)$_z$, and
R$^{32}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula III-6 are preferably selected from the group of the compounds of the formulae III-6a and III-6b, more preferably these compounds of the formula III-6 predominantly consist, even more preferably essentially consist and very particularly preferably completely consist thereof:

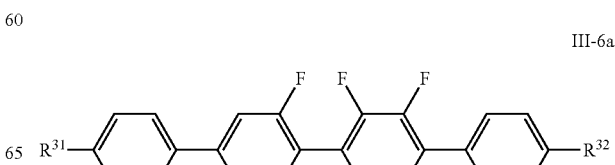

III-6a

III-6b

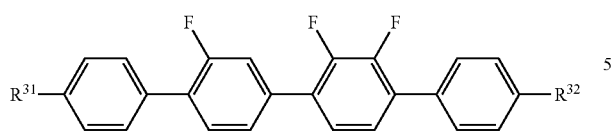

in which

R$^{31}$ has the meaning indicated above and preferably denotes $C_nH_{2n+1}$ or $CH_2$=CH—$(CH_2)_z$, and R$^{32}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of (R$^{31}$ and R$^{32}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$).

The media in accordance with the present invention optionally comprise one or more compounds of the formula IV

IV

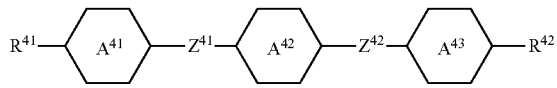

in which

R$^{41}$ and R$^{42}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl, one of Z$^{41}$ and Z$^{42}$ denotes trans-CH=CH—, trans-CF=CF— or —C≡C— and the other denotes, independently thereof, trans-CH=CH—, trans-CF=CF— or a single bond, preferably one of them denotes —C≡C— or trans-CH=CH— and the other denotes a single bond, and

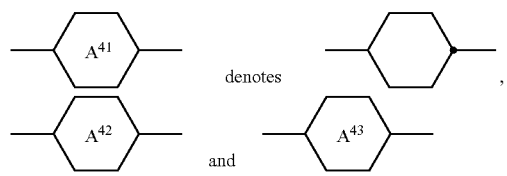

independently of one another, denote

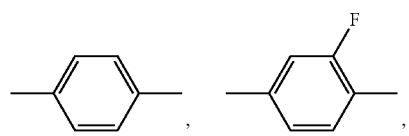

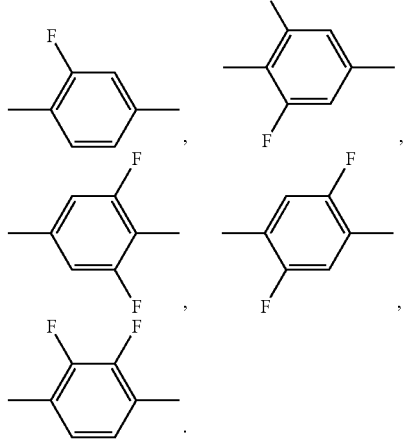

The liquid-crystalline media in accordance with the present application preferably comprise in total 0 to 40%, preferably 0 to 30% and particularly preferably 5 to 25%, of compounds of the formula IV.

The compounds of the formulae IV are preferably selected from the group of the compounds of the formulae IV-1 to IV-3, more preferably these compounds of the formula IV predominantly consist, even more preferably essentially consist and very particularly preferably completely consist thereof:

IV-1

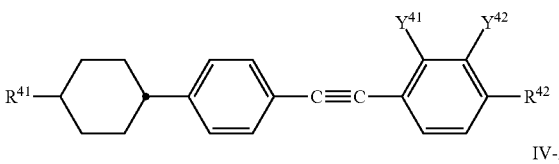

IV-2

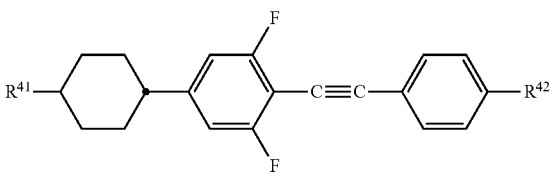

IV-3

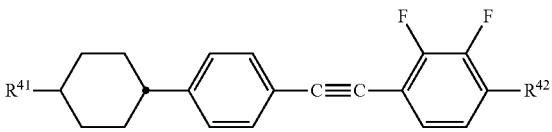

in which one of

Y$^{41}$ and Y$^{42}$ denotes H and the other denotes H or F, and

R$^{41}$ has the meaning indicated above and preferably denotes $C_nH_{2n+1}$ or $CH_2$=CH—$(CH_2)_z$, and R$^{42}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{41}$ and $R^{42}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$).

The compounds of the formulae IV-1 are preferably selected from the group of the compounds of the formulae IV-1a to IV-1c, more preferably these compounds of the formula IV-1 predominantly consist, even more preferably essentially consist and very particularly preferably completely consist thereof:

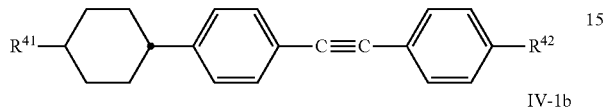

IV-1a

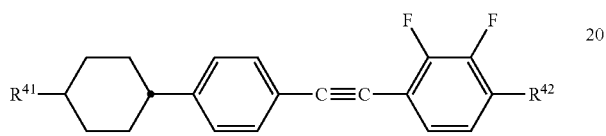

IV-1b

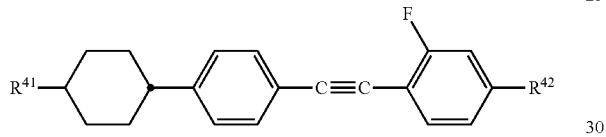

IV-1c in which $R^{41}$ has the meaning indicated above and preferably denotes $C_nH_{2n+1}$ or $CH_2$=CH—$(CH_2)_z$, and $R^{42}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{41}$ and $R^{42}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$).

The media in accordance with the present invention optionally comprise one or more compounds of the formula V

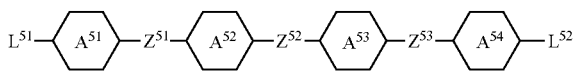

V in which $L^{51}$ denotes $R^{51}$ or $X^{51}$, $L^{52}$ denotes $R^{52}$ or $X^{52}$, $R^{51}$ and $R^{52}$, independently of one another, denote H, unfluorinated alkyl or alkoxy having 1 to 15, preferably 3 to 10 C atoms or unfluorinated alkenyl, alkenyloxy or alkoxyalkyl having 2 to 15, preferably 3 to 10, C atoms, preferably unfluorinated alkyl or alkenyl, $X^{51}$ and $X^{52}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and $Z^{51}$ to $Z^{53}$, independently of one another, denote trans-CH=CH—, trans-CF=CF—, —C≡C— or a single bond, preferably one or more of them denotes a single bond, and particularly preferably all denote a single bond,

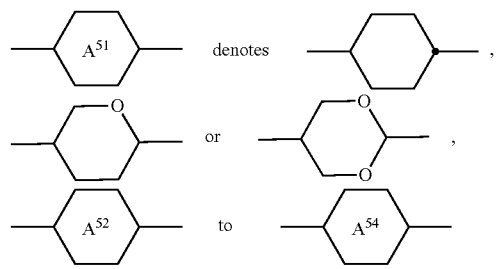

independently of one another, denote

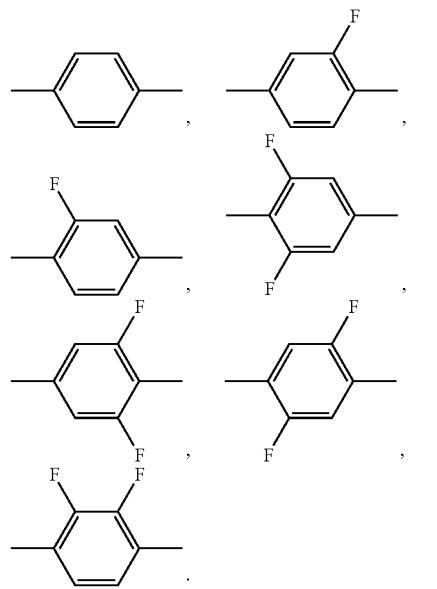

The compounds of the formula V are preferably selected from the group of the compounds of the formulae V-1 to V-3, more preferably these compounds of the formula V predominantly consist, even more preferably essentially consist and very particularly preferably completely consist thereof:

V-1

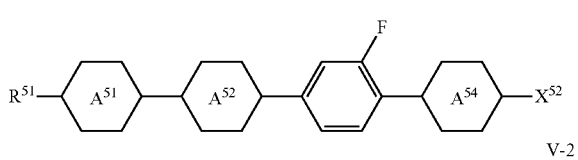

V-2

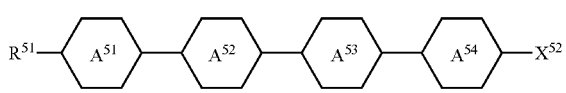

V-3

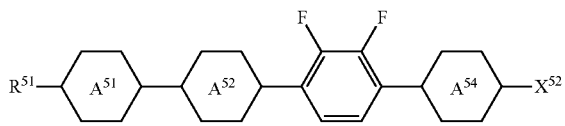

in which the parameters have the respective meanings indicated above under formula V and preferably
one of

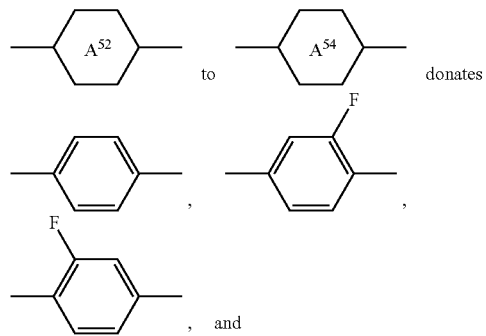

to donates and in which
- $R^{51}$ has the meaning indicated above and preferably denotes $C_nH_{2n+1}$ or $CH_2=CH-(CH_2)_z$, and
- $R^{52}$ has the meaning indicated above and preferably denotes $C_mH_{2m+1}$ or $O-C_mH_{2m+1}$ or $(CH_2)_z-CH=CH_2$, and
- $X^{52}$ has the meaning indicated above and preferably denotes fluorinated alkoxy, fluorinated alkenyloxy, F or Cl, and in which
- n and m, independently of one another, denote an integer in the range from 0 to 15, preferably in the range from 1 to 7 and particularly preferably 1 to 5, and
- z denotes 0, 1, 2, 3 or 4, preferably 0 or 2.

The preferred combinations of ($R^{51}$ and $R^{52}$) here are, in particular, ($C_nH_{2n+1}$ and $C_mH_{2m+1}$) and ($C_nH_{2n+1}$ and $O-C_mH_{2m+1}$).

The liquid-crystalline media in accordance with the present application preferably comprise in total 5 to 30%, preferably 10 to 25% and particularly preferably 15 to 20%, of compounds of the formula V.

The compounds of the formula V-1 are preferably selected from the group of the compounds of the formulae V-1a to V-1e, more preferably these compounds of the formula V-1 predominantly consist, even more preferably essentially consist and very particularly preferably completely consist thereof:

V-1a

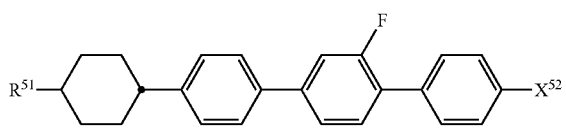

V-1b

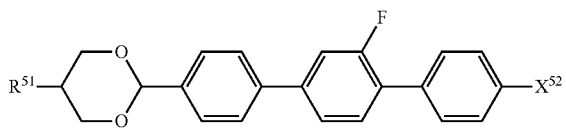

V-1c

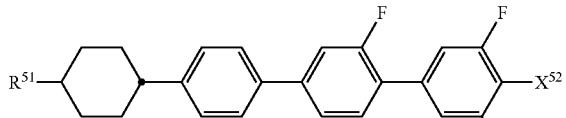

V-1d

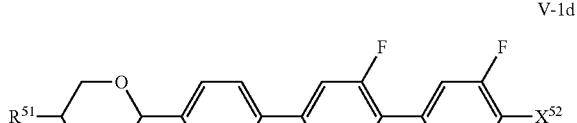

V-1e

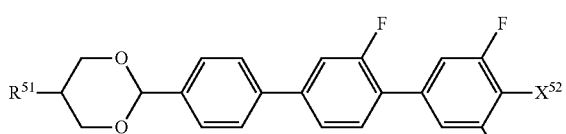

in which the parameters have the meaning given above and preferably
- $R^{51}$ has the meaning indicated above and preferably denotes $C_nH_{2n+1}$, and
- n denotes an integer in the range from 0 to 15, preferably in the range from 1 to 7 and particularly preferably 1 to 5, and
- $X^{52}$ preferably denotes F or Cl.

The compounds of the formula V-2 are preferably selected from the group of the compounds of the formulae V-2a and V-2b, more preferably these compounds of the formula V-2 predominantly consist, even more preferably essentially consist and very particularly preferably completely consist thereof:

V-2a

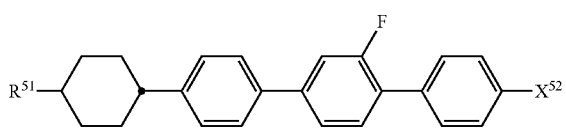

V-2b

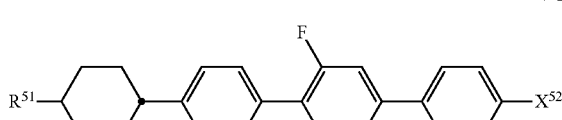

in which
- $R^{51}$ has the meaning indicated above and preferably denotes $C_nH_{2n+1}$ or $CH_2=CH-(CH_2)_z$, and
- $R^{52}$ has the meaning indicated above and preferably denotes $C_mH_{2m+1}$ or $O-C_mH_{2m+1}$ or $(CH_2)_z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combination of ($R^{51}$ and $R^{52}$) here is, in particular, ($C_nH_{2n+1}$ and $C_mH_{2m+1}$).

The compounds of the formula V-3 are preferably compounds of the formulae V-3a and V-3b:

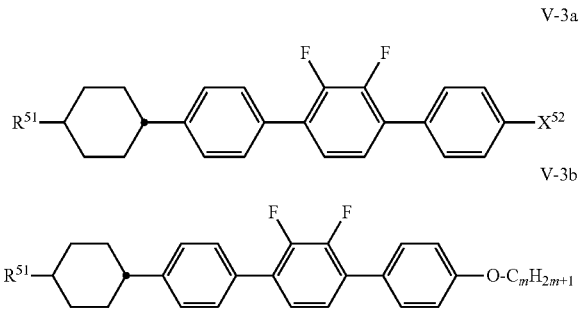

in which $R^{51}$ has the meaning indicated above and preferably denotes $C_nH_{2n+1}$ or $CH_2\!=\!CH\!-\!(CH_2)_Z$, and $R^{52}$ has the meaning indicated above and preferably denotes $C_mH_{2m+1}$ or $(CH_2)_Z\!-\!CH\!=\!CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{51}$ and $R^{52}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and O—$C_mH_{2m+1}$).

In a preferred embodiment of the present invention, the medium comprises one or more dielectrically positive compounds of the formula I-1 having a dielectric anisotropy of greater than 3.

The medium preferably comprises one or more dielectrically neutral compounds of the formula I-2 having a dielectric anisotropy in the range from more than −1.5 to 3.

In a preferred embodiment of the present invention, the medium comprises one or more compounds of the formula II.

In a further preferred embodiment of the present invention, the medium comprises one or more compounds of the formula III.

The liquid-crystalline media in accordance with the present invention preferably comprise 10% or less, preferably 5% or less, particularly preferably 2% or less, very particularly preferably 1% or less, and in particular absolutely no compound having only two or fewer five- and/or six-membered rings.

The definitions of the abbreviations (acronyms) are likewise indicated below in Table D or are evident from Tables A to C.

The liquid-crystalline media in accordance with the present invention preferably comprise, more preferably predominantly consist of, even more preferably essentially consist of and very preferably completely consist of compounds selected from the group of the compounds of the formulae I to V, preferably I to IV and very preferably I to III and/or V.

In this application, "to comprise" with respect to compositions means that the entity in question, i.e. the medium or the component, comprises the component or components or compound or compounds indicated, preferably in a total concentration of 10% or more and very preferably 20% or more.

In this context, "predominantly consist of" means that the entity in question comprises 55% or more, preferably 60% or more and very preferably 70% or more of the component or components or compound or compounds indicated.

In this context, "essentially consist of" means that the entity in question comprises 80% or more, preferably 90% or more and very preferably 95% or more of the component or components or compound or compounds indicated.

In this context, "completely consist of" means that the entity in question comprises 98% or more, preferably 99% or more and very preferably 100.0% of the component or components or compound or compounds indicated.

Other mesogenic compounds which are not explicitly mentioned above can optionally and advantageously also be used in the media in accordance with the present invention. Such compounds are known to the person skilled in the art.

The liquid-crystal media in accordance with the invention preferably have a clearing point of 90° C. or more, more preferably 100° C. or more, still more preferably 120° C. or more, particularly preferably 150° C. or more and very particularly preferably 170° C. or more.

The nematic phase of the media in accordance with the invention preferably extends at least from 20° C. or less to 90° C. or more, preferably up to 100° C. or more, more preferably at least from 0° C. or less to 120° C. or more, very preferably at least from −10° C. or less to 140° C. or more and in particular at least from −20° C. or less to 150° C. or more.

The Δε of the liquid-crystal medium in accordance with the invention, at 1 kHz and 20° C., is preferably 1 or more, more preferably 2 or more and very preferably 3 or more.

The Δn of the liquid-crystal media in accordance with the present invention, at 589 nm (NaD) and 20° C., is preferably in the range from 0.20 or more to 0.90 or less, more preferably in the range from 0.25 or more to 0.90 or less, even more preferably in the range from 0.30 or more to 0.85 or less and very particularly preferably in the range from 0.35 or more to 0.80 or less.

In a first preferred embodiment of the present application, the Δn of the liquid-crystal media in accordance with the present invention is preferably 0.50 or more, more preferably 0.55 or more.

The liquid-crystalline media in accordance with the present application preferably comprise in total 5 ppm or more and 3000 ppm or less, preferably 10 ppm or more and 2000 ppm or less and particularly preferably 50 ppm or more and 1000 ppm or less of compounds of the formula S1 or S2.

In accordance with the present invention, the individual compounds of the formula I are preferably used in a total concentration of 10% to 70%, more preferably 20% to 60%, even more preferably 30% to 50% and very preferably 25% to 45% of the mixture as a whole.

The compounds of the formula II are preferably used in a total concentration of 1% to 20%, more preferably 1% to 15%, even more preferably 2% to 15% and very preferably 3% to 10% of the mixture as a whole.

The compounds of the formula III are preferably used in a total concentration of 1% to 60%, more preferably 5% to 50%, even more preferably 10% to 45% and very preferably 15% to 40% of the mixture as a whole.

The liquid-crystal media preferably comprise, preferably predominantly consist of and very preferably completely consist of in total 50% to 100%, more preferably 70% to 100% and very preferably 80% to 100% and in particular 90% to 100% of the compounds of the formulae I, II, III, IV and V, preferably of the formulae I, III, IV and V, more preferably of the formulae I, II, III, IV and/or VI.

In the present application, the expression dielectrically positive describes compounds or components where $\Delta\varepsilon > 3.0$, dielectrically neutral describes those where $-1.5 \leq \Delta\varepsilon \leq 3.0$ and dielectrically negative describes those where $\Delta\varepsilon < -1.5$. $\Delta\varepsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

$\Delta\varepsilon$ is defined as $(\varepsilon_\| - \varepsilon_\perp)$, while $\varepsilon_{ave}$ is $(\varepsilon_\| + 2\varepsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\varepsilon$) is determined at a frequency of 1 kHz. The threshold voltages, as well as all other electro-optical properties, are determined using test cells produced at Merck KGaA, Germany. The test cells for the determination of $\Delta\varepsilon$ have a cell thickness of approximately 20 μm. The electrode is a circular ITO electrode having an area of 1.13 cm² and a guard ring. The orientation layers are SE-1211 from Nissan Chemicals, Japan, for homeotropic orientation ($\varepsilon_\|$) and polyimide AL-1054 from Japan Synthetic Rubber, Japan, for homogeneous orientation ($\varepsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The dielectric anisotropy in the microwave region is defined as $$\Delta\varepsilon_r \equiv (\varepsilon_{r,\|} - \varepsilon_{r,\perp}).$$

The tuneability (τ) is defined as $$\tau \equiv (\Delta\varepsilon_r / \varepsilon_{r,\|}).$$

The material quality (η) is defined as $$\eta \equiv (\tau / \tan \delta_{\varepsilon^r,max}), \text{ where}$$

the maximum dielectric loss is $$\tan \delta_{\varepsilon^r,max} \equiv \max.\{\tan \delta_{\varepsilon^r,\perp}; \tan \delta_{\varepsilon_{r,\|}}\}.$$

The liquid-crystalline media are investigated with respect to their properties in the microwave frequency range as described in A. Penirschke, S. Müller, P. Scheele, C. Weil, M. Wittek, C. Hock and R. Jakoby: "Cavity Perturbation Method for Characterization of Liquid Crystals up to 35 GHz", 34th European Microwave Conference—Amsterdam, pp. 545-548.

Compare in this respect also A. Gaebler, F. Gölden, S. Müller, A. Penirschke and R. Jakoby "Direct Simulation of Material Permittivites . . . ", 12MTC 2009—International Instrumentation and Measurement Technology Conference, Singapore, 2009 (IEEE), pp. 463-467, and DE 10 2004 029 429 A, in which a measurement method is likewise described in detail.

The liquid crystal is introduced into a polytetrafluoroethylene (PTFE) capillary. The capillary has an internal radius of 180 μm and an external radius of 350 μm. The effective length is 2.0 cm. The filled capillary is introduced into the centre of the cavity with a resonance frequency of 30 GHz. This cavity has a length of 6.6 mm, a width of 7.1 mm and a height of 3.6 mm. The input signal (source) is then applied, and the result of the output signal is recorded using a commercial vector network analyser.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 in A. Penirschke, S. Müller, P. Scheele, C. Weil, M. Wittek, C. Hock and R. Jakoby: "Cavity Perturbation Method for Characterization of Liquid Crystals up to 35 GHz", 34th European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla. The alignment of the magnets is set correspondingly and then rotated correspondingly through 90°.

Preferred components are phase shifters, varactors, wireless and radio wave antenna arrays, matching circuit adaptive filters and others.

In the present application, the term compounds is taken to mean both one compound and a plurality of compounds, unless expressly stated otherwise.

The liquid-crystal media according to the invention preferably have nematic phases of in each case at least from −20° C. to 80° C., preferably from −30° C. to 85° C. and very particularly preferably from −40° C. to 100° C. The phase particularly preferably extends to 120° C. or more, preferably to 140° C. or more and very particularly preferably to 180° C. or more. The expression have a nematic phase here means on the one hand that no smectic phase and no crystallisation are observed at low temperatures at the corresponding temperature and on the other hand that no clearing occurs on heating from the nematic phase. The investigation at low temperatures is carried out in a flow viscometer at the corresponding temperature and checked by storage in test cells having a layer thickness of 5 μm for at least 100 hours. At high temperatures, the clearing point is measured in capillaries by conventional methods.

Furthermore, the liquid-crystal media according to the invention are characterised by high optical anisotropy values. The birefringence at 589 nm is preferably 0.20 or more, particularly preferably 0.25 or more, particularly preferably 0.30 or more, particularly preferably 0.40 or more and very particularly preferably 0.45 or more. In addition, the birefringence is preferably 0.80 or less.

The liquid crystals employed preferably have a positive dielectric anisotropy. This is preferably 2 or more, preferably 4 or more, particularly preferably 6 or more and very particularly preferably 10 or more.

Furthermore, the liquid-crystal media according to the invention are characterised by high anisotropy values in the microwave range. The birefringence at about 8.3 GHz is, for example, preferably 0.14 or more, particularly preferably 0.15 or more, particularly preferably 0.20 or more, particularly preferably 0.25 or more and very particularly preferably 0.30 or more. In addition, the birefringence is preferably 0.80 or less.

The material quality η(μ-waves)/tan(δ) of the preferred liquid-crystal materials is 5 or more, preferably 6 or more, preferably 8 or more, preferably 10 or more, preferably 15 or more, preferably 17 or more, particularly preferably 20 or more and very particularly preferably 25 or more.

The preferred liquid-crystal materials have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

In some embodiments, however, liquid crystals having a negative value of the dielectric anisotropy can also advantageously be used.

The liquid crystals employed are either individual substances or mixtures. They preferably have a nematic phase.

The term "alkyl" preferably encompasses straight-chain and branched alkyl groups having 1 to 15 carbon atoms, in particular the straight-chain groups methyl, ethyl, propyl, butyl, pentyl, hexyl and heptyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of the formula $C_nH_{2n+1}$—O—$(CH_2)_m$, in which n and m each, independently of one another, denote 1 to 10. Preferably, n is 1 and m is 1 to 6.

Compounds containing a vinyl end group and compounds containing a methyl end group have low rotational viscosity.

In the present application, both high-frequency technology and hyper-frequency technology denote applications having frequencies in the range from 1 MHz to 1 THz, preferably from 1 GHz to 500 GHz, more preferably 2 GHz to 300 GHz, particularly preferably from about 5 to 150 GHz.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media in this application.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called premixes, which can be, for example, homologous or eutectic mixtures of compounds, or using so-called "multibottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius.

All temperature differences are quoted in differential degrees.

In the present invention and especially in the following examples, the structures of the mesogenic compounds are indicated by means of abbreviations, also referred to as acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1-E-alkenyl, respectively, in each case having n, m or l C atoms. Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations.

TABLE A

Ring elements

[Chemical structures of ring elements: C, D, DI, A, AI, P, G, GI, U, UI, Y, M, MI, N, NI, Np]

TABLE A-continued

Ring elements

[Chemical structures: N3f, N3fI, tH, tHI, tH2f, tH2fI, dH, K, KI, L, LI, F, FI]

TABLE B

| | Linking groups | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | | |

TABLE C

| End groups | | | |
|---|---|---|---|
| Left-hand side | | Right-hand side | |
| Use alone | | | |
| -n- | $C_nH_{2n+1}$— | -n | —$C_nH_{2n+1}$ |
| -nO- | $C_nH_{2n+1}$—O— | -nO | —O—$C_nH_{2n+1}$ |
| -V- | $CH_2$=CH— | -V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n+1}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | $CFH_2$— | -M | —$CFH_2$ |
| -D- | $CF_2H$— | -D | —$CF_2H$ |
| -T- | $CF_3$— | -T | —$CF_3$ |
| -MO- | $CFH_2O$— | -OM | —$OCFH_2$ |
| -DO- | $CF_2HO$— | -OD | —$OCF_2H$ |
| -TO- | $CF_3O$— | -OT | —$OCF_3$ |
| -OXF- | $CF_2$=CH—O— | -OXF | —O—CH=$CF_2$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |
| Use together with others | | | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots " . . . " are place-holders for other abbreviations from this table.

The following table shows illustrative structures together with their respective abbreviations. These are shown in order to illustrate the meaning of the rules for the abbreviations. They furthermore represent compounds which are preferably used.

The illustrative structures are compounds having three 6-membered rings which are particularly preferably employed:

TABLE D

Illustrative structures

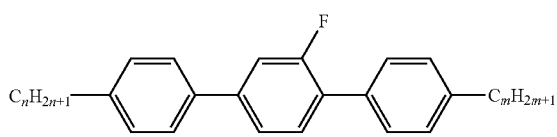

PGP-n-m

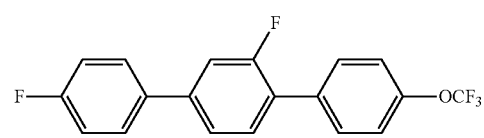 [SMILES: Fc1ccc(-c2ccc(-c3ccc(OC(F)(F)F)cc3)c(F)c2)cc1]

PGP-F-OT

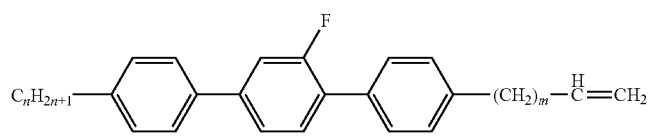

PGP-n-mV

TABLE D-continued
Illustrative structures
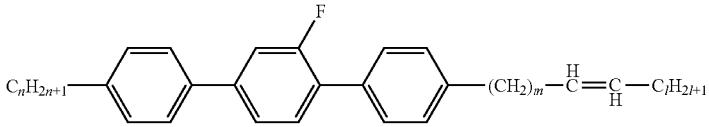
PGP-n-mVI
PYP-n-m
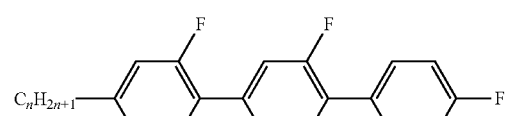
GGP-n-F
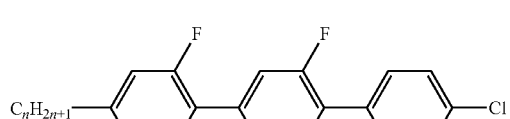
GGP-n-CL
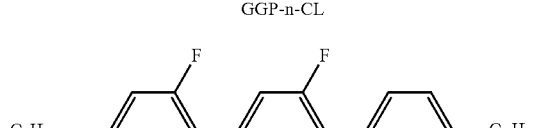
GGP-n-m
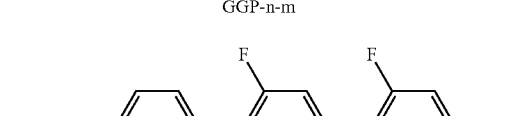
PGIGI-n-F
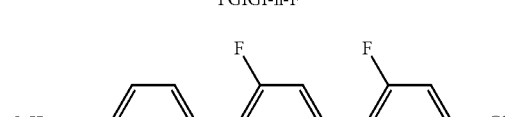
PGIGI-n-CL
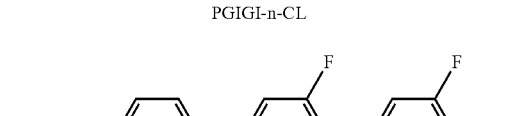
PGU-n-F TABLE D-continued
Illustrative structures
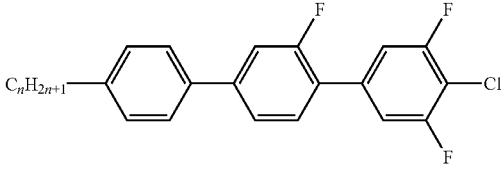
PGU-n-CL
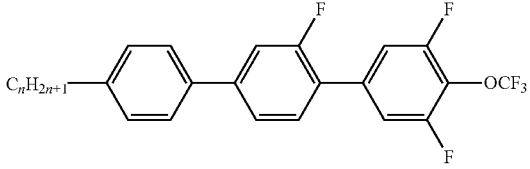
PGU-n-OT
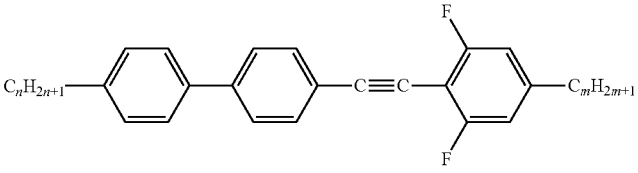
PPTUI-n-m
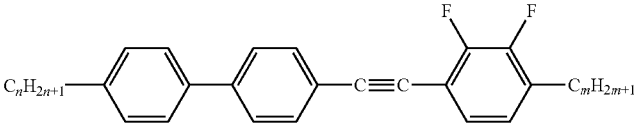
PPTY-n-m
The illustrative structures are compounds having four 6-membered rings which are particularly preferably employed:
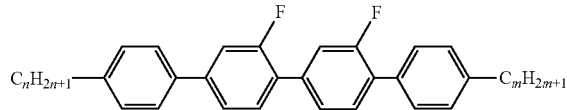
PGGP-n-m
PGIGP-n-m
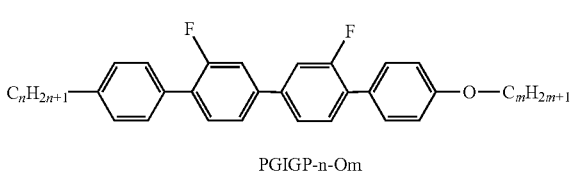
PGIGP-n-Om
-continued
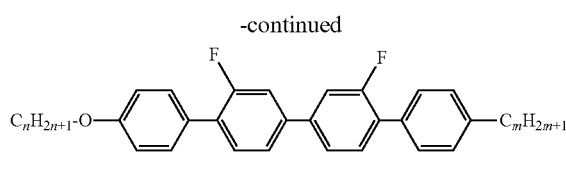
PGIGP-nO-m
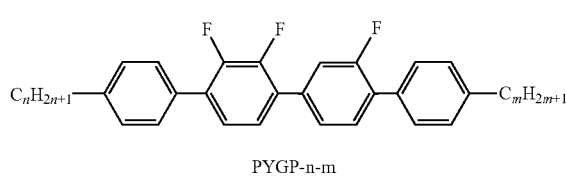
PYGP-n-m
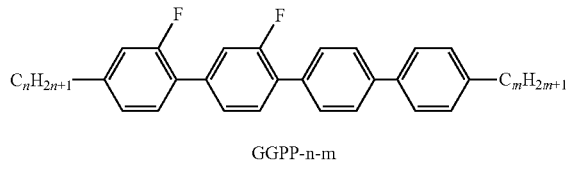
GGPP-n-m

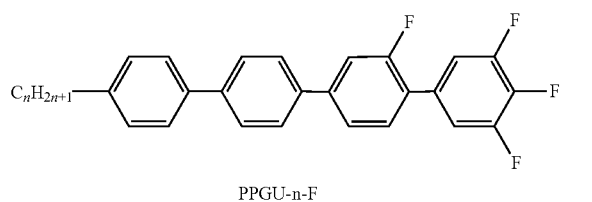
PPGU-n-F
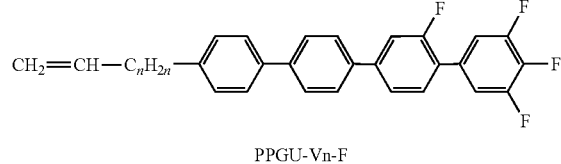
PPGU-Vn-F
Illustrative structures of dielectrically neutral compounds which are preferably employed:
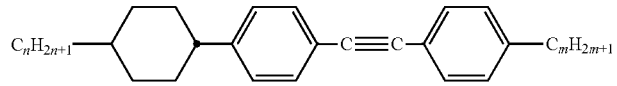
CPTP-n-m
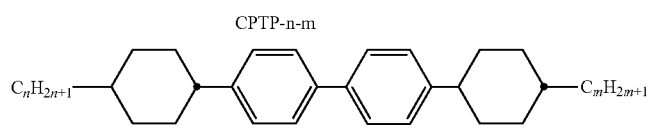
CPPC-n-m
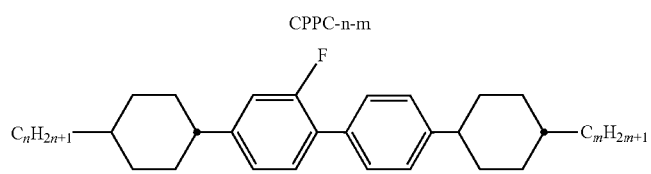
CGPC-n-m
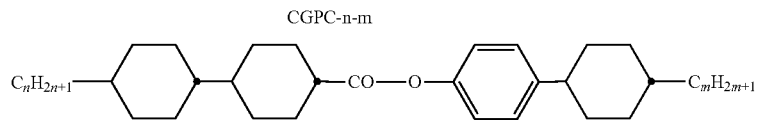
CCZPC-n-m
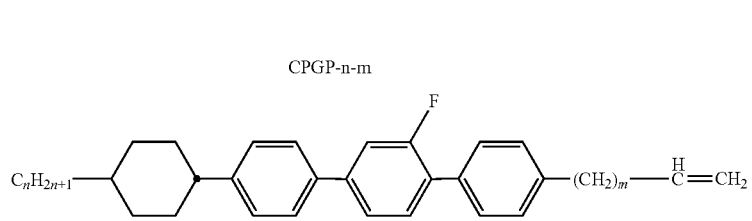
CPGP-n-m
CPGP-n-mV
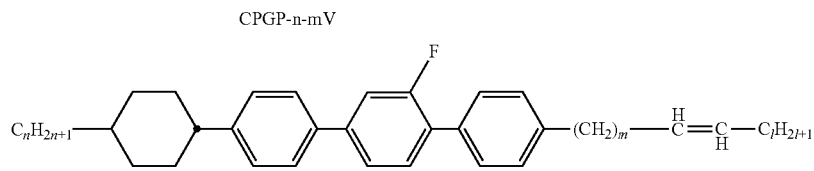
CPGP-n-mVI Illustrative structures of further compounds which are preferably employed:
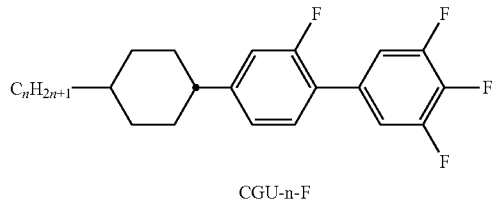
CGU-n-F
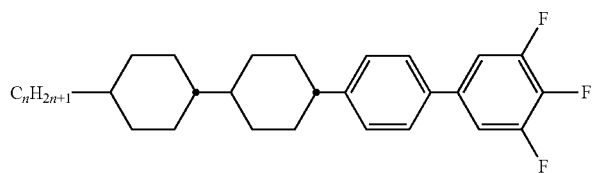
CCPU-n-F
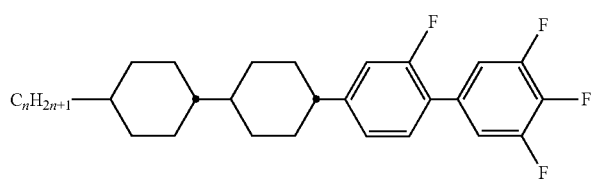
CCGU-n-F
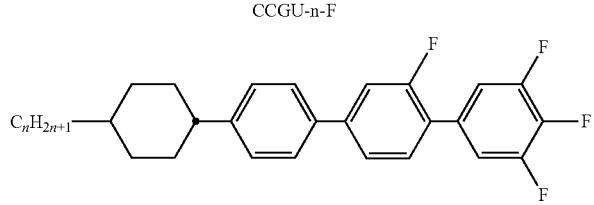
CPGU-n-F
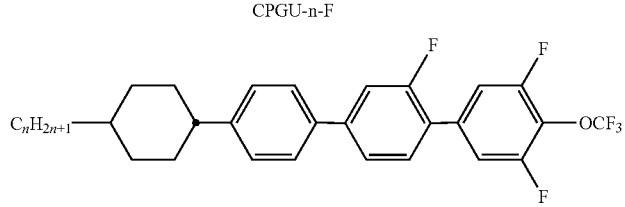
CPGU-n-OT
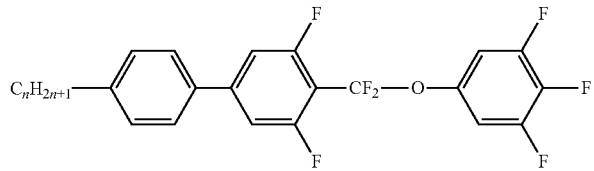
PUQU-n-F
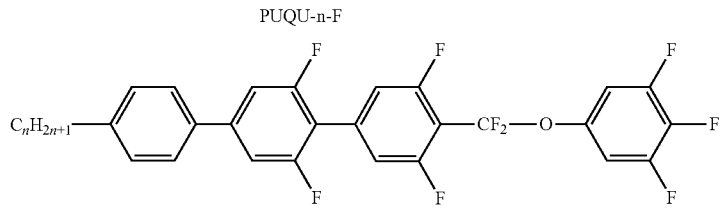
PGUQU-n-F

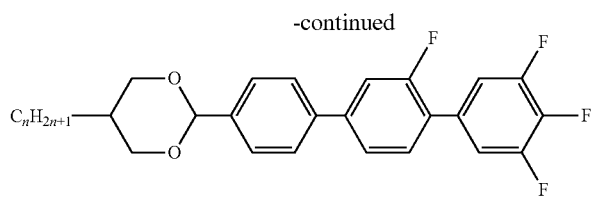
DPGU-n-F
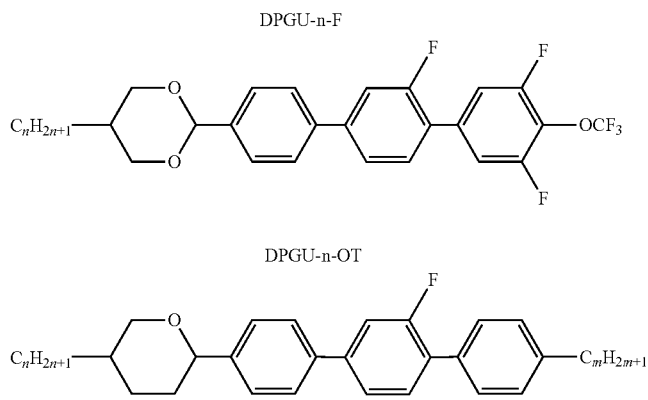
DPGU-n-OT
APGP-n-m
The following table, Table E, shows illustrative compounds which can be used as stabiliser in the mesogenic media in accordance with the present invention. The total concentration of these and similar compounds in the media is preferably 5% or less.
TABLE E
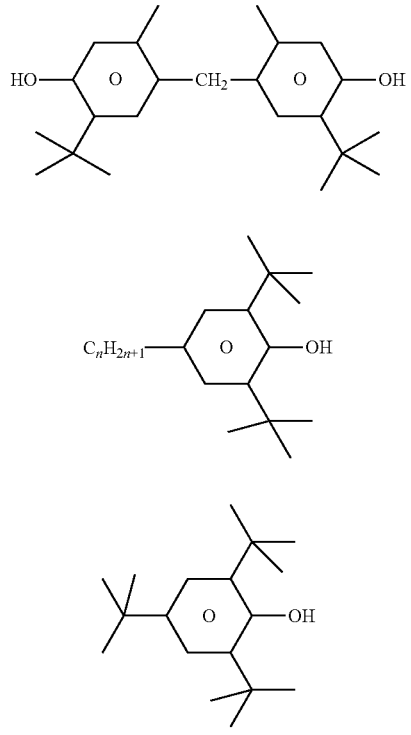
TABLE E-continued
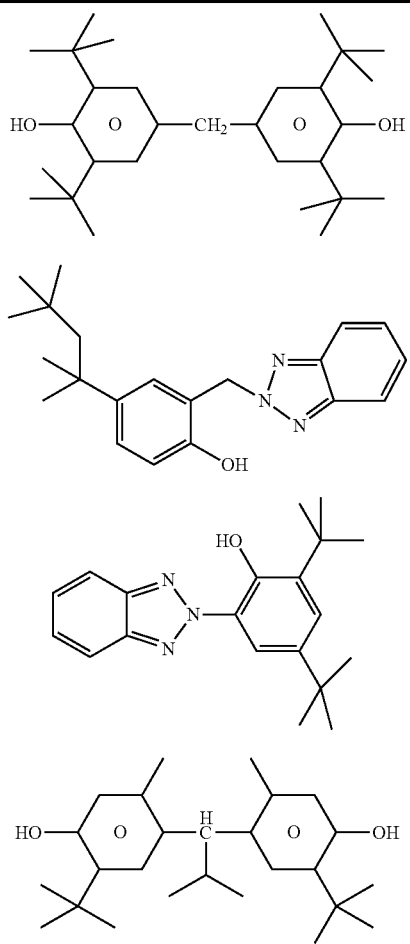

TABLE E-continued
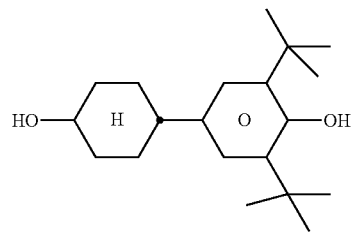
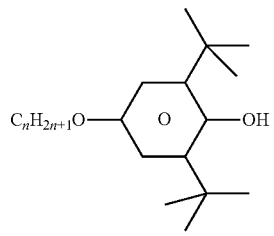
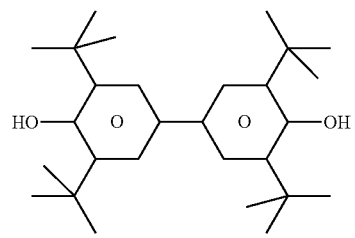
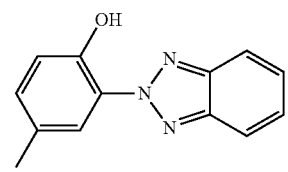 [SMILES: Cc1ccc(O)c(-n2nc3ccccc3n2)c1]
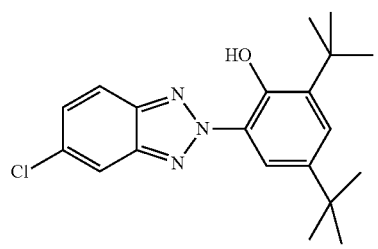 [SMILES: CC(C)(C)c1cc(-n2nc3ccc(Cl)cc3n2)c(O)c(C(C)(C)C)c1]
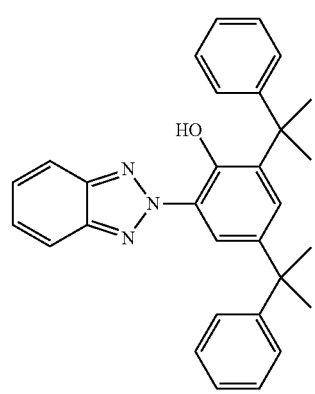 [SMILES: CC(C)(c1ccccc1)c1cc(-n2nc3ccccc3n2)c(O)c(C(C)(C)c2ccccc2)c1]
TABLE E-continued
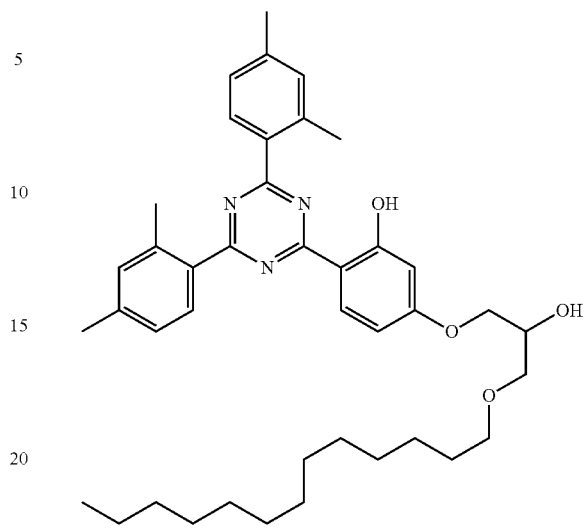
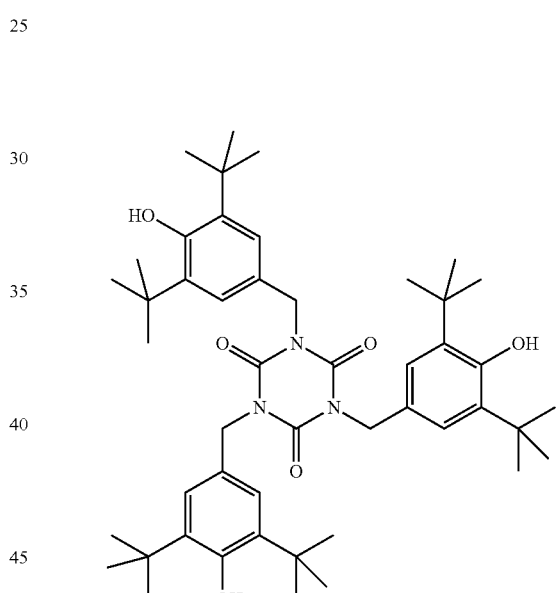
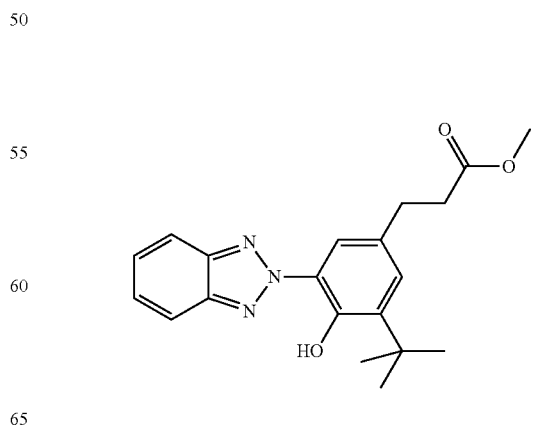

TABLE E-continued
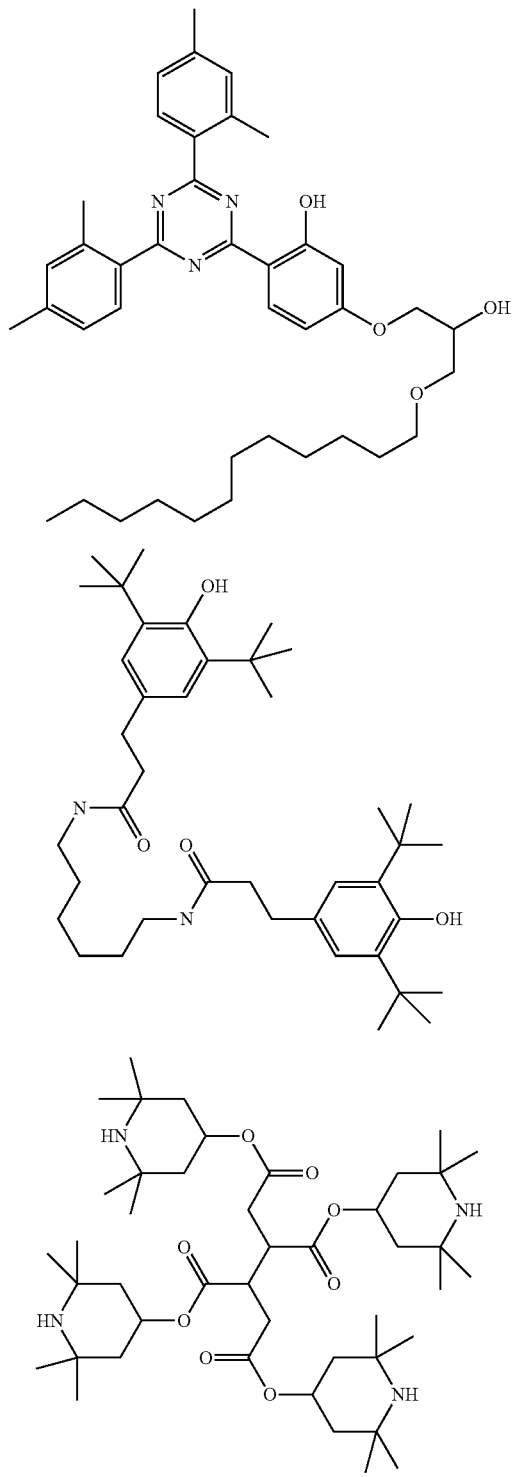
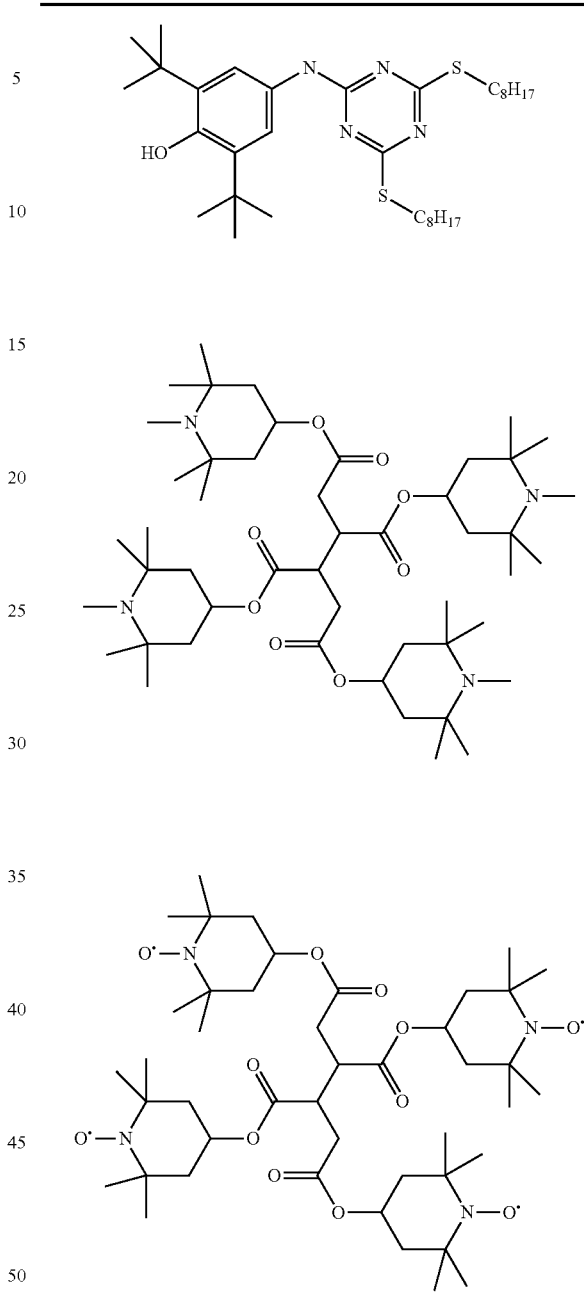
In a preferred embodiment of the present invention, the mesogenic media comprise one or more compounds selected from the group of the compounds from Table E.
The following table, Table F, shows illustrative compounds which can preferably be used as chiral dopants in the mesogenic media in accordance with the present invention.
TABLE F
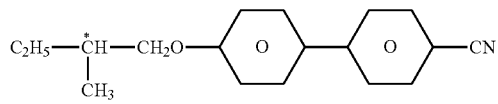

TABLE F-continued
C 15
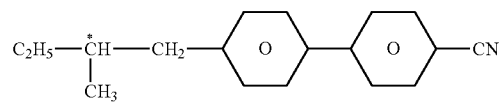
CB 15
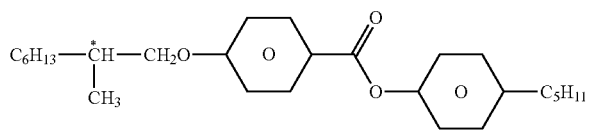
CM 21
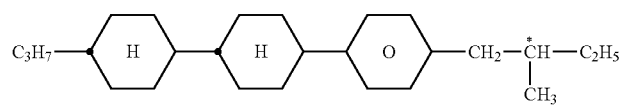
CM 44
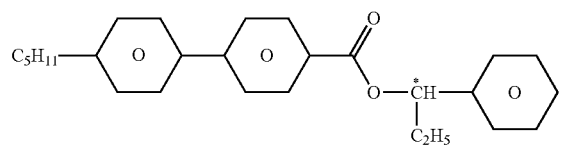
CM 45
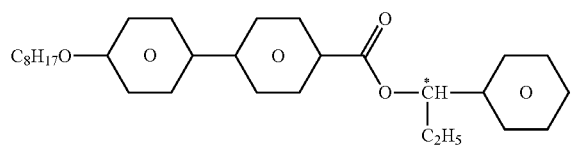
CM 47
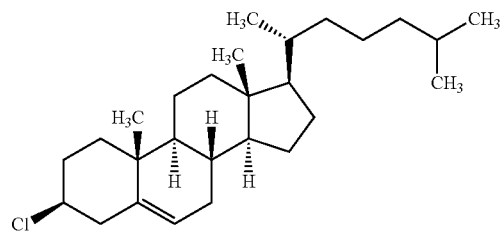
CC
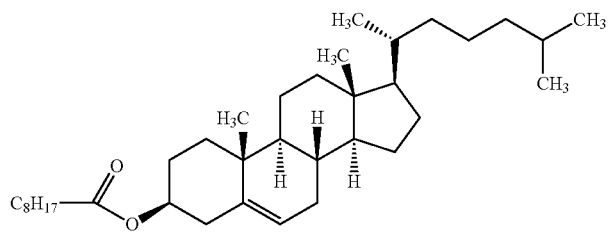
CN TABLE F-continued
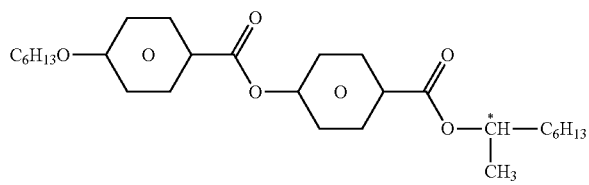
R/S-811
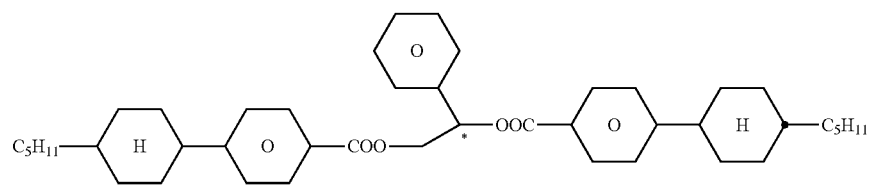
R/S-1011
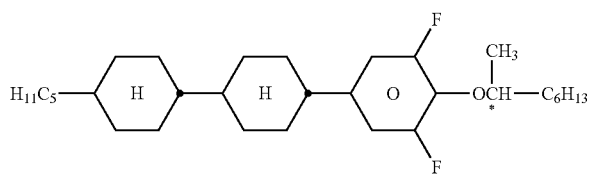
R/S-2011
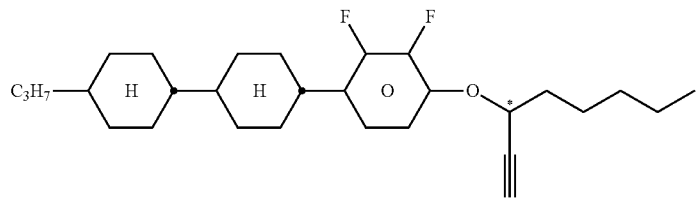
R/S-3011
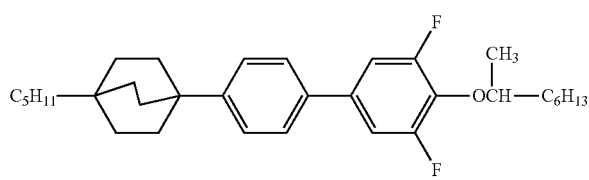
R/S-4011
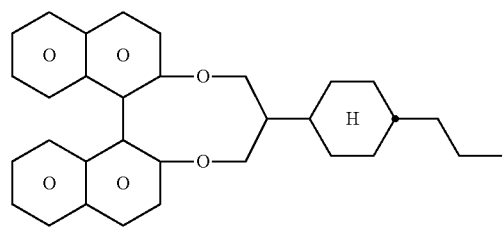
R/S-5011

In a preferred embodiment of the present invention, the mesogenic media comprise one or more compounds selected from the group of the compounds from Table F.

The mesogenic media in accordance with the present application preferably comprise two or more, preferably four or more, compounds selected from the group consisting of the compounds from the above tables.

The liquid-crystal media in accordance with the present invention preferably comprise
seven or more, preferably eight or more, compounds, preferably compounds having three or more, preferably four or more, different formulae, selected from the group of the compounds from Table D.

EXAMPLES

The following examples illustrate the present invention without limiting it in any way.

However, it is clear to the person skilled in the art from the physical properties what properties can be achieved and in what ranges they can be modified. In particular, the combination of the various properties which can preferably be achieved is thus well defined for the person skilled in the art.

Irradiation experiments are performed in glass capillary tubes of 0.4 mm glass thickness. After the liquid crystal is filled into the tube the tube is irradiated with a total dose of gamma ray of 300 krad, which corresponds to 15-30 years of operation in space. The clearing temperatures of the samples are measured before and after irradiation.

Examples 1.1 to 1.4

The following mixture (M-1) is prepared and investigated.

| Mixture M-1 | | |
|---|---|---|
| Composition | | |
| Compound | | Concentration/ |
| No. | Abbreviation | % by weight |
| 1 | PPTUI-3-2 | 20.0 |
| 2 | PPTUI-3-4 | 36.0 |
| 3 | GGP-3-CL | 10.0 |
| 4 | GGP-5-CL | 20.0 |
| 5 | CPGP-5-2 | 7.0 |
| 6 | CPGP-5-3 | 7.0 |
| Σ | | 100.0 |
| Physical properties | | |
| T(N, I) = | | 173.0° C. |
| Δn(20° C., 589 nm) = | | 0.3348 |
| Δε(20° C., 1 kHz) = | | 4.0 |
| γ$_1$(20° C.) = | | 727 mPa · s |
| k$_{11}$(20° C.) = | | 23.5 pN |
| k$_{33}$(20° C.) = | | 32.0 pN |

Mixture M-1 is divided into ten parts. First, as a reference (ref.), the clearing temperature of the unstabilised mixture is measured before and after irradiation. Next, the remaining parts are use to prepare the stabilised mixtures given in table 1 using the stabilisers of formula S1-1 and S2-1 in the amounts given in table 1. Again, the clearing temperatures are measured before and after irradiation.

TABLE 1

| Example | Mixture | Stabiliser | c(Stab.)/ ppm | T$_{(N, I)}$ before | T$_{(N, I)}$ after |
|---|---|---|---|---|---|
| (Ref.) | M-1 | none | 0 | 173.0 | 163.0 |
| 1.1 | M-1-1 | S1-1 | 100 | 173.0 | 165.0 |
| 1.2 | M-1-2 | S1-1 | 500 | 173.0 | 172.0 |
| 1.3 | M-1-3 | S2-1 | 100 | 173.0 | 164.5 |
| 1.4 | M-1-4 | S2-1 | 500 | 173.0 | 172.5 |

A lower clearing temperature after irradiation means some damage to the liquid crystal.

As can be seen from the results given in table 1, the unstabilised mixture M-1 suffers from a serious drop of the clearing temperature upon irradiation. A small amount of 100 ppm of either compound S1-1 or S2-1 already shows a stabilising effect. The use of 500 ppm of S1-1 or S2-1 results, within the error limits, in complete stabilisation against gamma ray irradiation.

The invention claimed is:

1. A microwave antenna array comprising a component for high-frequency technology which is a phase shifter, wherein the phase shifter comprises a liquid-crystal medium, which liquid-crystal medium has a birefringence, Δn, of from 0.25 to 0.90 and a dielectric anisotropy, Δε, of 1 or more and which liquid-crystal medium comprises:

one or more compounds of formula S-2, in the medium in a concentration of 500 ppm to 5000 ppm,

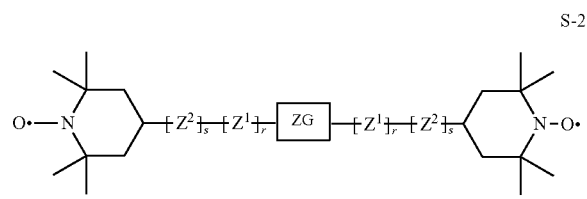

in which $Z^1$, $Z^2$ independently of one another, denote —O—, —(C=O)—, or a single bond, but do not both simultaneously denote —O—, r and s, independently of one another, denote 0 or 1, denotes a divalent straight-chain or branched alkyl having 1 to 20 C atoms, cycloalkyl, cycloalkylalkyl or alkylcycloalkyl, where one or more —CH$_2$— groups in all these groups are optionally replaced by —O— in such a way that two O atoms in the molecule are not bonded directly to one another, and Alkyl denotes a straight-chain or branched alkyl having 1 to 20 C atoms;

and
one or more compounds of the formula I and
one or more compounds of the formula II-1 to II-4,
or
one or more compounds of the formula II-1 to II-4 and
one or more compounds of the formula III, or
one or more compounds of the formula I and
one or more compounds of the formula II-1 to II-4 and
one or more compounds of the formula III:

I in which
$L^{11}$ denotes $R^{11}$ or $X^{11}$,
$L^{12}$ denotes $R^{12}$ or $X^{12}$,
$R^{11}$ and $R^{12}$, independently of one another, denote H, unfluorinated alkyl or unfluorinated alkoxy having 1 to 15 C atoms or unfluorinated alkenyl, unfluorinated alkenyloxy or unfluorinated alkoxyalkyl having 2 to 15 C atoms,
$X^{11}$ and $X^{12}$, independently of one another, denote H, F, Cl, —CN, —NCS, —SF$_5$, fluorinated alkyl or fluorinated alkoxy having 1 to 7 C atoms or fluorinated alkenyl, unfluorinated alkenyloxy or unfluorinated or fluorinated alkoxyalkyl having 2 to 7 C atoms, and

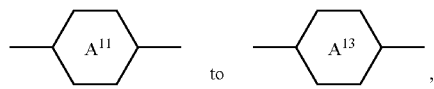

independently of one another, denote

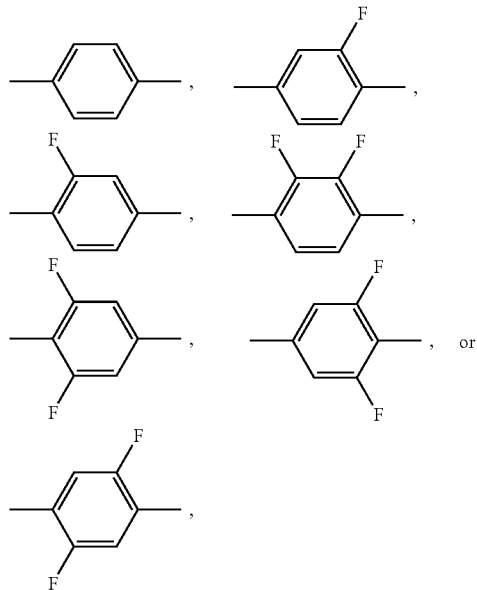

II-1
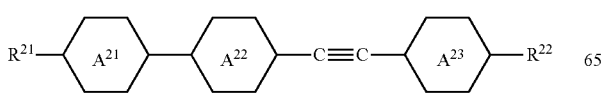

II-2
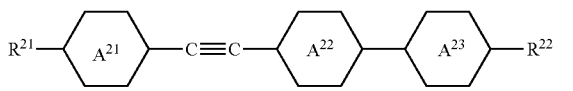

II-3
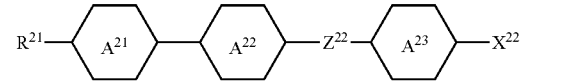

II-4

in which
$Z^{21}$ and $Z^{22}$ denote trans-CH=CH— or trans-CF=CF—,
$R^{21}$ and $R^{22}$, independently of one another, denote H, unfluorinated alkyl or alkoxy having 1 to 7 C atoms or unfluorinated alkenyl having 2 to 7 C atoms,
n and m, independently of one another, denote an integer in the range from 0 to 15,
z denotes 0, 1, 2, 3 or 4,
$R^{21}$ and $R^{22}$, independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms,
$X^{22}$, denotes F or Cl, —CN, —NCS, —SF$_5$, fluorinated alkyl or fluorinated alkoxy having 1 to 7 C atoms or fluorinated alkenyl, fluorinated alkenyloxy or fluorinated alkoxyalkyl having 2 to 7 C atoms, and

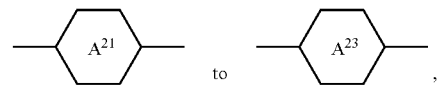

independently of one another, denote

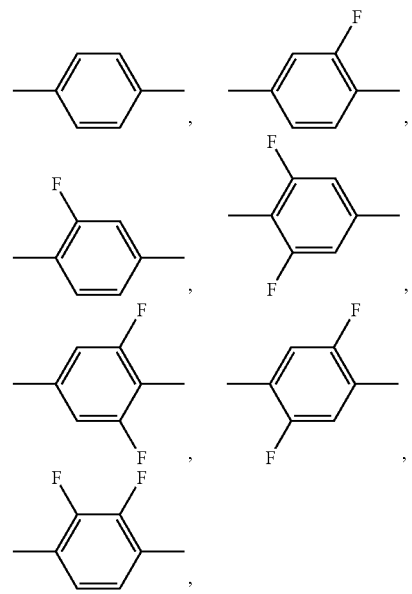

-continued

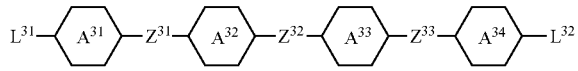
III in which
L$^{31}$ denotes R$^{31}$ or X$^{31}$,
L$^{32}$ denotes R$^{32}$ or X$^{32}$,
R$^{31}$ and R$^{32}$, independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms,
X$^{31}$ and X$^{32}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms,
Z$^{31}$ to Z$^{33}$, independently of one another, denote trans-CH=CH—, trans —CF=CF—, —C≡C— or a single bond, and

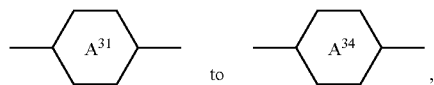

independently of one another, denote

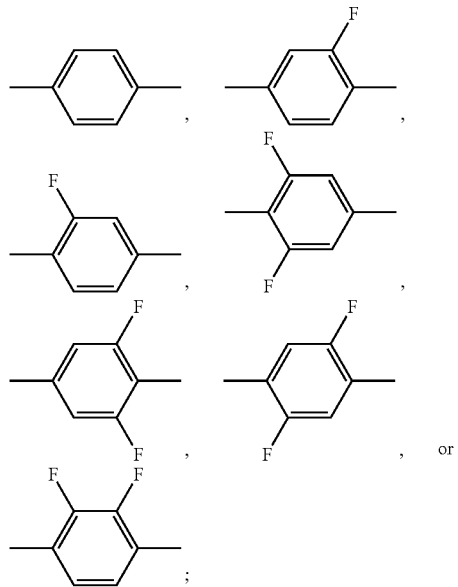

and
optionally one or more further compounds.

2. The microwave antenna array of claim 1, wherein the liquid-crystal medium comprises one or more compounds of the formula I.

3. The microwave antenna array of claim 2, wherein the concentration of the compounds of the formula I in the medium in total is in the range from 15% to 70%.

4. The microwave antenna array of claim 1, wherein the liquid-crystal medium comprises one or more compounds of the formula III.

5. The microwave antenna array of claim 1, wherein the concentration of the compounds of the formulae II-1 to II-4 in the medium in total is in the range from 1% to 60%.

6. The microwave antenna array of claim 2, wherein the liquid-crystal medium comprises one or more compounds selected from the group of the compounds of the formulae I-1 to I-3:

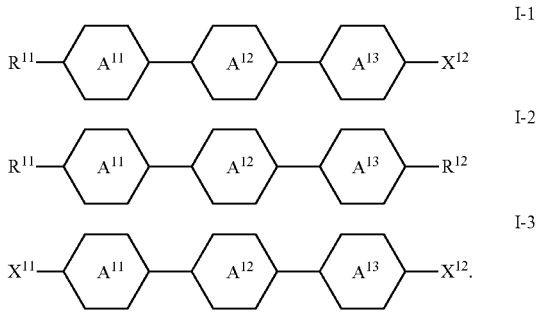

7. The microwave antenna array of claim 1, wherein the one or more compounds of formula S-2 in the liquid crystal medium include a compound of the formula S2-1:

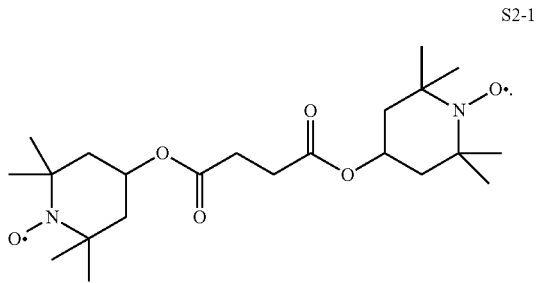

8. The microwave antenna array of claim 1, wherein the liquid crystal medium comprises one or more compounds of the formulae II-1 to II-4, wherein:
R$^{21}$ and R$^{22}$, independently of one another, denote H, unfluorinated alkyl or alkoxy having 1 to 7 C atoms or unfluorinated alkenyl having 2 to 7 C atoms,
X$^{22}$ denotes F, Cl, —CN or —NCS,
at least one of

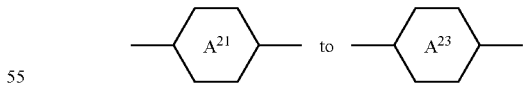

denotes

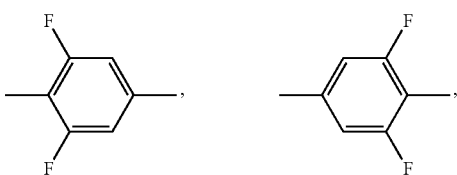

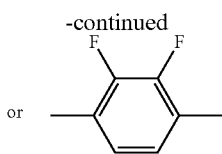

and the others, independently of one another, denote

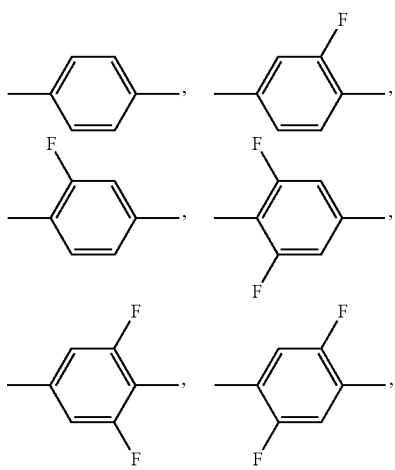

$R^{21}$ denotes $C_nH_{2n+1}$ or $CH_2\!=\!CH\!-\!(CH_2)_z$, and
$R^{22}$ denotes $C_mH_{2m+1}$ or $O\!-\!C_mH_{2m+1}$ or $(CH_2)_z\!-\!CH\!=\!CH_2$,
n and m, independently of one another, denote an integer in the range from 1 to 7, and
z denotes 0 or 2.

9. The microwave antenna array of claim 1, wherein the liquid crystal medium comprises one or more compounds of the formula II-1 to II-4 which are of the following formulae:

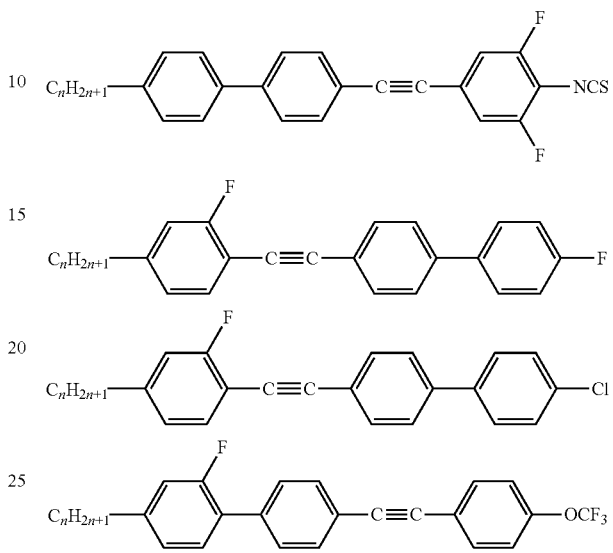

in which n denotes an integer in the range from 0 to 7.

10. The microwave antenna array of claim 1, wherein the liquid crystal medium comprises one or more compounds of the formula II-1 or II-2.

\* \* \* \* \*